US012436713B2

(12) United States Patent
Lee et al.

(10) Patent No.: US 12,436,713 B2
(45) Date of Patent: Oct. 7, 2025

(54) MEMORY SYSTEM USING HOST MEMORY BUFFER AND OPERATION METHOD THEREOF

(71) Applicant: SAMSUNG ELECTRONICS CO., LTD., Suwon-si (KR)

(72) Inventors: Bumhee Lee, Suwon-si (KR); Wooram Kim, Suwon-si (KR); Hyunseok Kim, Suwon-si (KR); Kihyun Park, Suwon-si (KR); Sooyun Lee, Suwon-si (KR); Hyeongyu Cho, Suwon-si (KR); Shin-Ho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/662,090

(22) Filed: May 13, 2024

(65) Prior Publication Data

US 2024/0295988 A1 Sep. 5, 2024

Related U.S. Application Data

(63) Continuation of application No. 17/979,554, filed on Nov. 2, 2022, now Pat. No. 12,014,080.

(30) Foreign Application Priority Data

Nov. 10, 2021 (KR) ........................ 10-2021-0154276
May 4, 2022 (KR) ........................ 10-2022-0055613

(51) Int. Cl.
*G06F 3/06* (2006.01)
*G06F 1/3203* (2019.01)
*G06F 12/02* (2006.01)

(52) U.S. Cl.
CPC .......... *G06F 3/0656* (2013.01); *G06F 1/3203* (2013.01); *G06F 3/0604* (2013.01);
(Continued)

(58) Field of Classification Search
None
See application file for complete search history.

(56) References Cited

U.S. PATENT DOCUMENTS 7,809,962 B2 10/2010 Chang et al.
8,725,977 B2 5/2014 Moon et al.
(Continued)

FOREIGN PATENT DOCUMENTS

KR 10-2014-0145063 A 12/2014
KR 10-2016-0122330 A 10/2016
(Continued)

OTHER PUBLICATIONS

Extended European Search Report issued on Mar. 21, 2023 for European Patent Application No. 22206748.0.
(Continued)

*Primary Examiner* — Kaushikkumar M Patel
(74) *Attorney, Agent, or Firm* — Sughrue Mion, PLLC

(57) ABSTRACT

There is provided an operation method of a memory system which includes a host and a storage device, and the operation method includes allocating a portion of a host memory included in the host for a host memory buffer to be used by a controller of the storage device, setting a set feature command such that the host memory buffer is enabled, setting a retention command including information about a response speed of the host memory buffer, selecting an operation mode of the host memory buffer, based on the retention command, and selecting one of a plurality of power states, which the controller supports, based on a performance objective of the operation mode of the host memory buffer.

20 Claims, 20 Drawing Sheets

(52) U.S. Cl.
CPC .......... *G06F 3/0622* (2013.01); *G06F 3/0679* (2013.01); *G06F 12/0223* (2013.01)

(56) References Cited

U.S. PATENT DOCUMENTS

| | | | |
|---|---|---|---|
| 8,909,850 B2 | 12/2014 | Sopko et al. | |
| 8,938,597 B2 | 1/2015 | Goss et al. | |
| 8,959,280 B2 | 2/2015 | Yu et al. | |
| 9,563,382 B2 | 2/2017 | Hahn et al. | |
| 10,042,586 B2 | 8/2018 | Mylly | |
| 10,360,156 B2 | 7/2019 | Yun et al. | |
| 10,929,309 B2 | 2/2021 | Benisty et al. | |
| 11,011,243 B2 | 5/2021 | Lee et al. | |
| 11,880,274 B2 | 1/2024 | Kim et al. | |
| 2014/0281145 A1 | 9/2014 | Tomlin et al. | |
| 2015/0106557 A1 | 4/2015 | Yu et al. | |
| 2016/0026406 A1 | 1/2016 | Hahn et al. | |
| 2016/0246726 A1 | 8/2016 | Hahn | |
| 2017/0206030 A1 | 7/2017 | Woo et al. | |
| 2018/0107417 A1 | 4/2018 | Shechter et al. | |
| 2019/0042414 A1* | 2/2019 | Juenemann | G06F 3/0679 |
| 2019/0138220 A1* | 5/2019 | Hahn | G06F 3/0611 |
| 2019/0146709 A1 | 5/2019 | Im et al. | |
| 2019/0266079 A1* | 8/2019 | R | G06F 3/0656 |
| 2019/0286351 A1 | 9/2019 | Ho et al. | |
| 2020/0012595 A1* | 1/2020 | Bordia | G06F 3/0673 |
| 2020/0142766 A1 | 5/2020 | Choi et al. | |
| 2020/0151109 A1* | 5/2020 | Cho | G06F 12/1009 |
| 2021/0096778 A1* | 4/2021 | Nagarajan | G06F 3/0656 |
| 2022/0262441 A1* | 8/2022 | Kanamori | G11C 16/3427 |
| 2022/0391132 A1 | 12/2022 | Agarwal et al. | |
| 2023/0074941 A1 | 3/2023 | Kim et al. | |
| 2023/0129363 A1* | 4/2023 | Wei | G06F 3/0611 711/103 |

FOREIGN PATENT DOCUMENTS

| | | |
|---|---|---|
| KR | 10-2017-0043996 A | 4/2017 |
| KR | 10-2018-0054394 A | 5/2018 |
| KR | 10-2019-0054448 A | 5/2019 |
| KR | 10-2019-0057779 A | 5/2019 |
| KR | 10-2020-0038723 A | 4/2020 |
| KR | 10-2020-0054402 A | 5/2020 |
| KR | 10-2020-0122115 A | 10/2020 |
| KR | 10-2021-0077923 A | 6/2021 |
| KR | 10-2021-0110071 A | 9/2021 |

OTHER PUBLICATIONS

NVM Express Base Specification Revision 1.4a, Mar. 9, 2020, pp. 1-405, XP055878018, URL: https://nvmexpress.org/wp-content/uploads/NVM-Express-1_4a-2020.03.09-Ratified.pdf.

* cited by examiner

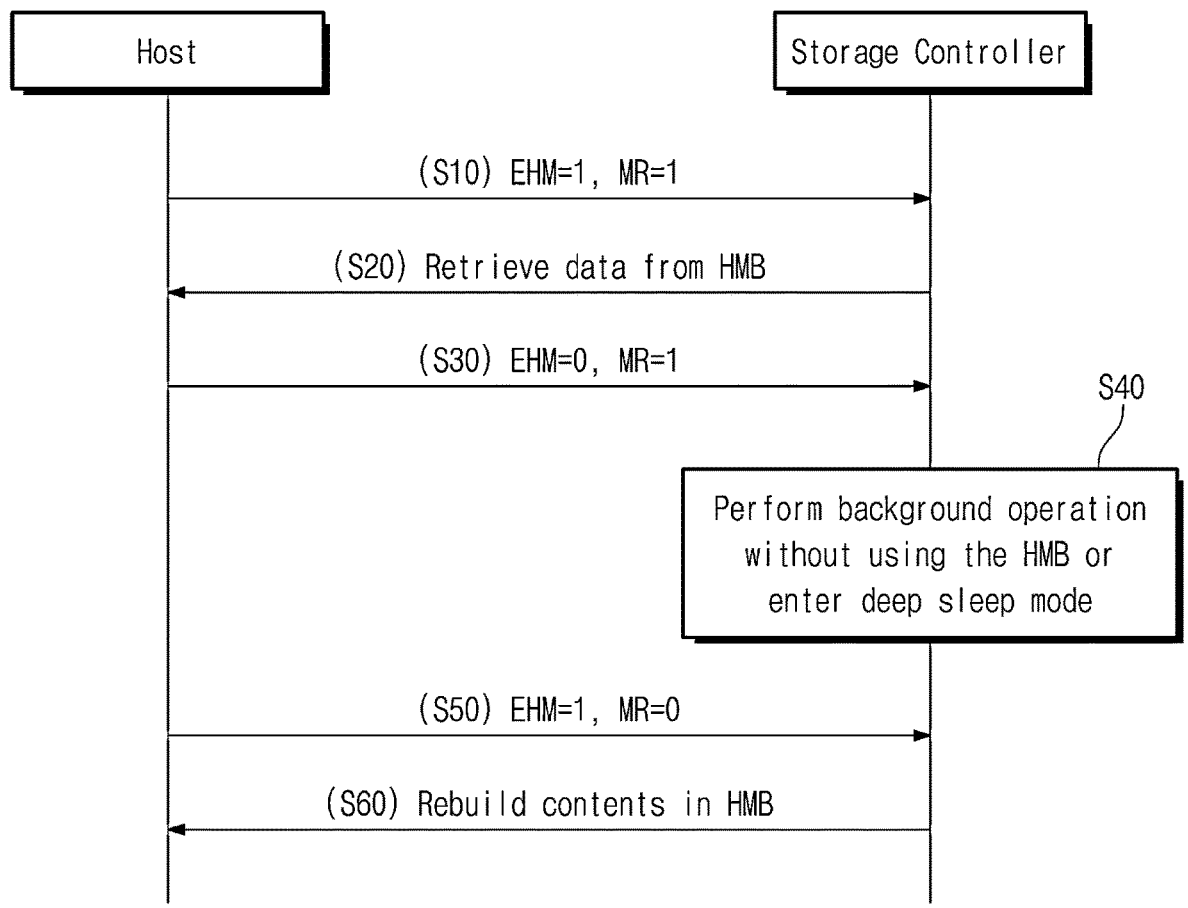

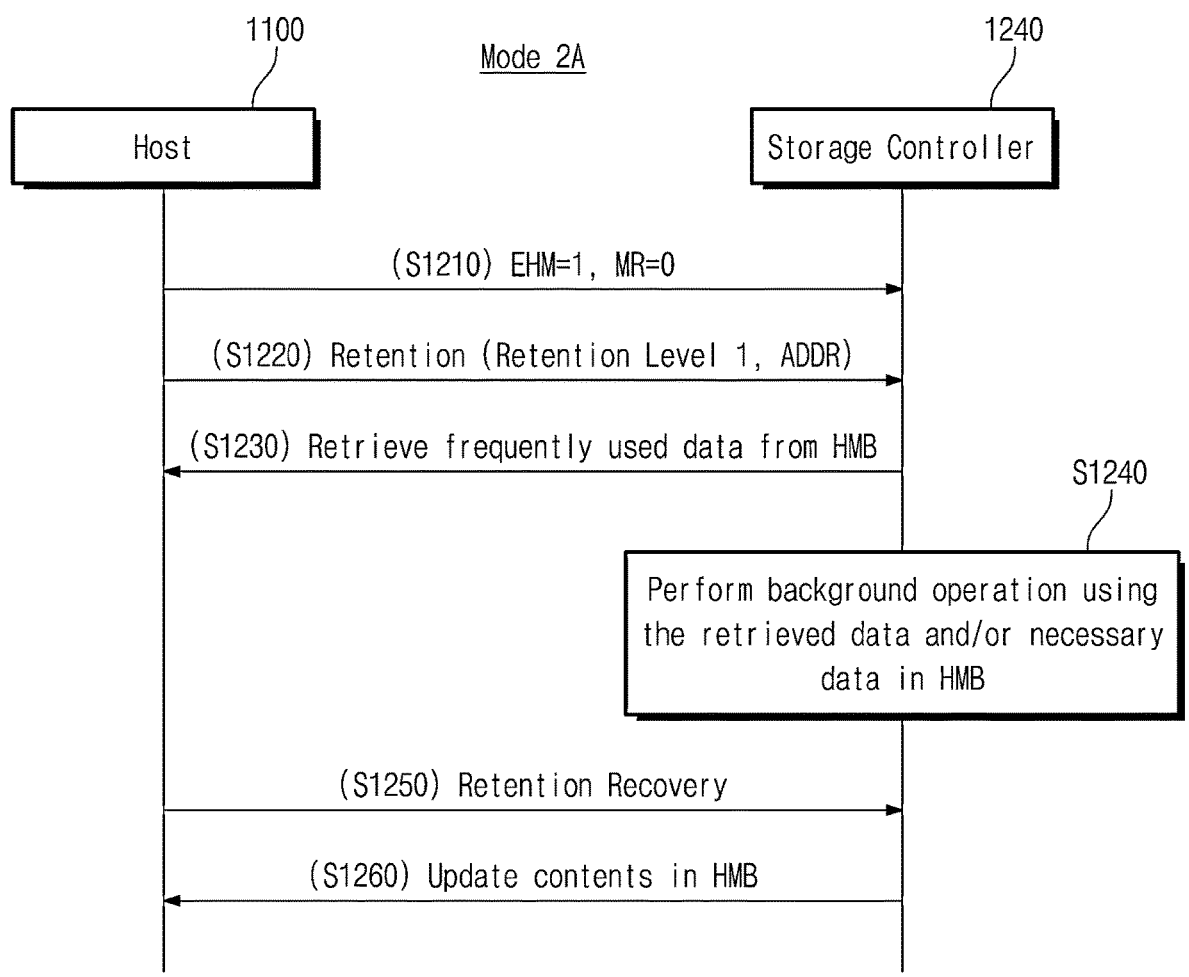

MEMORY SYSTEM USING HOST MEMORY BUFFER AND OPERATION METHOD THEREOF

CROSS-REFERENCE TO RELATED APPLICATIONS

This application is a Continuation of U.S. application Ser. No. 17/979,554, filed on Nov. 2, 2022, which is based on and claims priority from Korean Patent Application No. 10-2021-0154276 filed on Nov. 10, 2021 and Korean Patent Application No. 10-2022-0055613 filed on May 4, 2022, in the Korean Intellectual Property Office, the disclosures of which are incorporated by reference herein in their entireties.

BACKGROUND

1. Field

Embodiments of the disclosure described herein relate to a memory system, and more particularly, relate to a memory system using a host memory buffer and an operation method thereof.

2. Description of Related Art

Recently, flash memory-based high-capacity storage devices, such as a solid state drive (hereinafter referred to as "SSD"), are in high demand and are being used for various purposes. For example, the SSD may be used as an SSD for server, an SSD for client, an SSD for data center, etc. An interface of the SSD should provide the best speed and reliability for each purpose. To satisfy the above demand, interfaces such as a serial Advanced Technology (AT) attachment (SATA) interface, a PCI Express (PCIe) interface, and a serial attached SCSI (SAS) are being used as the best SSD interface. In particular, nowadays, PCIe-based NVMe or UFS-based Unified Memory Extension (UME) is being actively developed and is being applied to storage devices. The interfaces provide a function that allows devices to share a memory. For example, a host may allocate a portion of a memory region in the host to a storage device, and the allocated memory region may be called a host memory buffer HMB.

With regard to the memory sharing technique, there is an increasing demand on a technique that allows the storage device efficiently uses the host memory buffer HMB. The reason is that the host memory buffer HMB is placed in the host but is utilized by the storage device. In particular, according to the related art, the host sends only an enable signal or a disable signal, which indicates whether the host memory buffer HMB is available, to the storage device and does not send information about a response speed of the host memory buffer HMB. In this case, because the storage device accesses the host memory buffer HMB regardless of the response speed of the host memory buffer HMB, the overall performance of the memory system is reduced.

SUMMARY

Embodiments of the disclosure provide a memory system capable of operating a host memory buffer differently depending on a response speed of the host memory buffer.

According to an aspect of the disclosure, there is provided an operation method of a memory system which includes a host and a storage device, the method including: allocating a portion of a host memory included in the host as a host memory buffer for the storage device; setting a set feature command to enable the host memory buffer; setting a retention command including information about a response speed of the host memory buffer; selecting an operation mode of the host memory buffer, based on the retention command; and selecting a power state, among a plurality of power states supported by a controller of the storage device, based on a performance objective of the operation mode of the host memory buffer.

The method may further include selecting, by the host, a non-operational power state as a power state of the controller.

The method may further include receiving, at the controller, at least a portion of data present in the host memory buffer for performing an operation permitted in the non-operational power state.

The method may further include sending, by the controller, an acknowledge signal providing notification that the receiving of the at least the portion of the data present in the host memory buffer is completed, to the host, and preventing the controller from accessing the host memory buffer after the acknowledge signal is sent.

The method may further include preventing the controller from accessing the host memory buffer, after the non-operational power state is selected.

The method may further include preventing the controller from accessing the host memory buffer based on the retention command.

The method may further include permitting the controller to access the host memory buffer based on an expected response time of the host memory buffer being smaller than a reference response time.

The method may further include, based on the access of the controller to the host memory buffer being permitted, selecting, by the host, an active power state as a power state of the controller.

The host memory buffer may include at least two regions, and wherein the retention command may include information about a response speed for each of the at least two regions.

The method may further include receiving, at the controller, a retention recovery command from the host; and incorporating data present in the storage device in the host memory buffer.

According to another aspect of the disclosure, there is provided an operation method of a memory system which includes a host and a storage device, the method including: allocating a portion of a host memory included in the host as a host memory buffer for the storage device; setting a set feature command to enable the host memory buffer; setting a retention command including information about a response speed of the host memory buffer; and selecting an operation mode of the host memory buffer, based on the retention command.

The method may further include receiving at least a portion of data present in the host memory buffer to be stored in the storage device.

The method may further include sending, by a controller of the storage device, an acknowledge signal providing notification that the receiving of the at least the portion of the data present in the host memory buffer is completed, to the host, and preventing the controller from accessing the host memory buffer after the acknowledge signal is sent.

The method may further include preventing the controller from accessing the host memory buffer based on the retention command.

The retention command may include an address and a retention level of the host memory buffer, and wherein the retention level is determined by comparing an expected response speed of the host memory buffer and at least one reference response time.

The method may further include selecting, by the controller, an operation mode of the host memory buffer based on the retention level included in the retention command.

The host memory buffer may include at least two regions, and wherein the retention command may include a retention level for each of the at least two regions.

The method may further receiving, at the controller, a retention recovery command from the host; and incorporating data present in the storage device in the host memory buffer.

According to another aspect of the disclosure, there is provided a storage device which shares a host memory of a host, including: an interface configured to access a partial region of the host memory as a host memory buffer of the storage device; and a storage controller configured to: select one of a first mode, a second mode, and a third mode as an operation mode of the host memory buffer based on a response speed of the host memory buffer, and based on the first mode being selected, permit the host memory buffer to access the storage device, based on the second mode being selected, permit the host memory buffer to access the storage device, and receiving and storing, by the storage device, frequently used data of data present in the host memory buffer, and based on the third mode being selected, prevent the host memory buffer from accessing the storage device.

While the access of the storage device to the host memory buffer is not permitted in the third mode, an enable host memory (EHM) command for an enable of the host memory buffer is in an enable state, and a memory return (MR) command for a return of the host memory buffer is in a disable state.

According to another aspect of the disclosure, there is provided a host apparatus connected to a storage device, the host apparatus including: one or more memories storing instructions; and one or more processors configured to execute the one or more instructions to: obtain a response speed of a host memory buffer corresponding to the storage device, the host memory buffer allocated in a portion of a host memory included in the host apparatus, as a host memory buffer for the storage device; generate a retention command based on the response speed of the host memory buffer, the retention command including information about the response speed of the host memory buffer; and select an operation mode of the host memory buffer, based on the retention command.

The one or more processors may be further configured to select a power state, among a plurality of power states supported by the controller, based on a performance characteristics of the operation mode of the host memory buffer.

BRIEF DESCRIPTION OF DRAWINGS

The above and other objects and features of the disclosure will become apparent by describing in detail embodiments thereof with reference to the accompanying drawings.

FIG. 8 is a diagram for describing a command transfer operation between a host and a storage controller when the retention occurs according to a related art example;

FIGS. 9A to 9E are diagrams for describing a command transfer operation between a host and a storage controller when the retention occurs according to different modes.

DETAILED DESCRIPTION

Below, embodiments of the disclosure will be described in detail and clearly to such an extent that an ordinary one in the art easily implements the invention.

Figure 1:
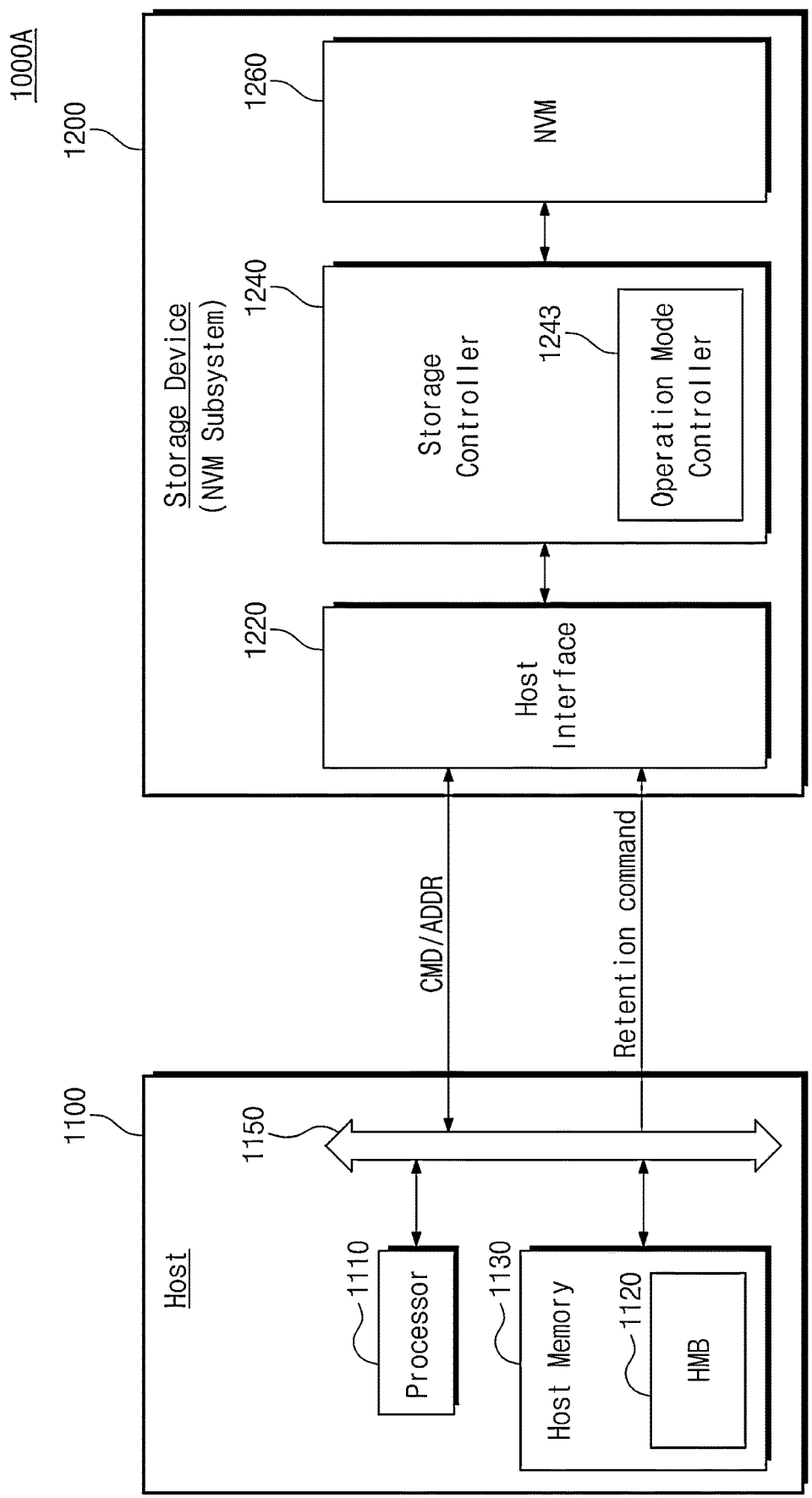
FIG. 1 is a block diagram illustrating a memory system according to an example embodiment of the disclosure.

FIG. 1 is a block diagram illustrating a memory system 1000A according to an example embodiment of the disclosure. Referring to FIG. 1, the memory system 1000A according to an example embodiment of the disclosure includes a host 1100 and a storage device 1200.

The memory system 1000A according to an example embodiment of the disclosure supports a host memory buffer function of sharing a partial region of a host memory 1130 with the storage device 1200. In addition, when there occurs retention situation, such that a response speed of a host memory buffer 1120 allocated to the storage device 1200 is delayed with respect with a normal speed, the host 1100 sends a retention command to the storage device 1200. The storage device 1200 selects a mode providing the best performance from among a plurality of modes based on the retention command and uses the host memory buffer 1120 depending on the selected mode. As such, the overall performance of the memory system 1000A may be improved.

In detail, the host 1100 writes data in the storage device 1200 or reads data stored in the storage device 1200. To this end, the host 1100 may send a command CMD and an address ADDR to the storage device 1200 for the purpose of writing data in the storage device 1200. Also, the host 1100 may send the command CMD and the address ADDR to the storage device 1200 for the purpose of reading data stored in the storage device 1200. The host 1100 includes a processor 1110, the host memory 1130, and an interface circuit 1150.

According to an example embodiment, the processor 1100 may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor 1100 may include multiple cores to execute the instructions. However, the disclosure is not limited thereto, and as such other types of processor may be implemented without departing from the disclosure.

According to an example embodiment, an application program, a file system, a device driver, etc. may be loaded onto the host memory 1130. Besides, various software executable in the host 1100 or data may be loaded onto the host memory 1130. In particular, the host 1100 may allocate a partial region of the host memory 1130 for the host memory buffer 1120 acting as a buffer of the storage device 1200.

The host memory buffer 1120 may refer to a region of the host memory 1130, which is allocated to the storage device 1200 so as to be used by the storage device 1200. For example, when the host memory buffer 1120 is allocated to the storage device 1200, the host memory buffer 1120 may be provided to be exclusively used by the storage device 1200. In this case, the host 1100 may delete the host memory buffer 1120 from a host memory descriptor list.

According to an example embodiment, the retention may occur in the host memory buffer 1120. Herein, the retention means that the response speed of the host memory buffer 1120 becomes slow compared to a normal case. That is, a retention may be detected when the response speed of the host memory is slower than a reference speed during normal operation. For example, it is assumed that the host memory 1130 is set to be activated at an interval of 200 ms in a power saving mode. When the host 1100 enters the power saving mode, there occurs the retention that the response speed of the host memory buffer 1120 becomes slow compared to the normal case. In addition, the retention may occur due to various causes such as degradation of memory cells of the host memory buffer 1120 and a replacement operation performed on defective memory cells.

When the retention occurs in the host memory buffer 1120, the host 1100 sends the retention command to the storage device 1200. Herein, the retention command includes an address of the host memory buffer 1120, at which the retention occurs, and a retention level corresponding to a delayed response speed. In an example embodiment, the host memory buffer 1120 may be divided into a plurality of HMB regions, and the retention may occur in at least one of the plurality of HMB regions. In this case, the host 1100 may send an address corresponding to the HMB region where the retention occurs, and a retention level to the storage device 1200.

The interface circuit 1150 provides the physical connection between the host 1100 and the storage device 1200. That is, the interface circuit 1150 converts commands, addresses, data, etc., which correspond to various requests generated from the host 1100, so to be suitable for the interface with the storage device 1200. A protocol of the interface circuit 1150 may include at least one of universal serial bus (USB), small computer system interface (SCSI), PCI express, ATA, parallel ATA (PATA), serial ATA (SATA), serial attached SCSI (SAS), and universal flash storage (UFS).

The storage device 1200 may also be called an NVM subsystem and is provided as data storage of the host 1100. Also, a partial region of the host memory 1130 in the host 1100 may be allocated to the storage device 1200, as the host memory buffer 1120, and thus, the storage device 1200 may use the host memory buffer 1120 like an internal buffer within the host 1100. The storage device 1200 may include a host interface 1220, a storage controller 1240, and a nonvolatile memory device 1260.

The host interface 1220 is provided as a physical communication channel of the storage device 1200, which is used for data exchange with the host 1100. The host interface 1220 may have an interfacing protocol that allows the host memory buffer 1120 to support the buffer function of the storage device 1200. That is, the host interface 1220 may support the interfacing manner for mutually sharing a memory resource of the host 1100 and a memory resource of the storage device 1200. For example, the storage controller 1240 may make it possible for the host interface 1220 to manage the host memory buffer 1120 and an internal buffer of the storage device 1200 by using one memory map.

The storage controller 1240 controls an overall operation of the storage device 1200. The storage controller 1240 includes an operation mode controller 1243 that selects an operation mode of the host memory buffer 1120 based on the retention command received from the host 1100.

The operation mode controller 1243 receives the retention command from the host 1100 and check a retention level of the host memory buffer 1120, in which the retention occurs, based on the retention command. Also, the operation mode controller 1243 may select an operation mode providing the best performance from among operation modes for the host memory buffer 1120 and may use the host memory buffer 1120, in which the retention occurs, depending on the selected operation mode.

For example, the operation mode controller 1243 may select a mode of permitting or blocking the access of the storage device 1200 to the host memory buffer 1120 depending on the retention level. Also, the operation mode controller 1243 may select a mode of retrieving a portion of data present in the host memory buffer 1120 and storing the retrieved data in the storage device 1200, depending on the retention level. As such, as the operation mode of the host memory buffer 1120 where the retention occurs is differently selected depending on the retention level, the overall performance of the memory system 1000A may be improved.

The nonvolatile memory device 1260 is provided as a storage medium of the storage device 1200. The nonvolatile memory device 1260 may include a nonvolatile memory such as a flash memory, a phase-change RAM (PRAM), a magnetic RAM (MRAM), a resistive RAM (ReRAM), a ferroelectric RAM (FRAM), a magnetic disk, etc.

As described above, the memory system 1000A according to an example embodiment of the disclosure selects the best mode from the operation modes for the host memory buffer 1120 based on the retention level and uses the host memory buffer 1120 in the selected mode. Accordingly, the overall performance of the memory system 1000A may be improved by operating the host memory buffer 1120 differently depending on the retention level.

Figure 2:
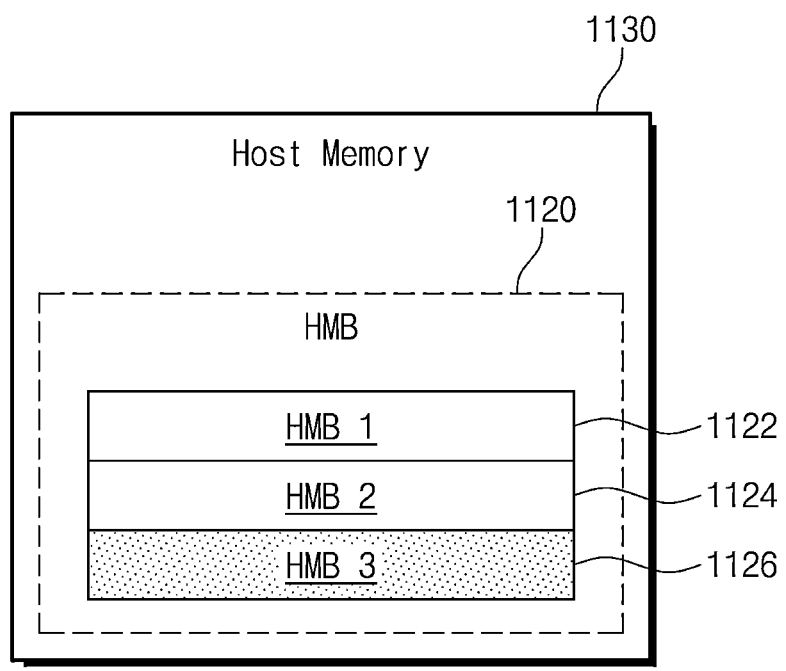
FIG. 2 is a block diagram illustrating an example of a host memory of FIG. 1.

FIG. 2 is a block diagram illustrating an example of the host memory 1130 of FIG. 1. In FIG. 2, for convenience of description, it is assumed that the host memory buffer 1120 is divided into a first HMB region 1122, a second HMB region 1124, and a third HMB region 1126. However, the disclosure is not limited thereto, and as such, different number of HMB regions may be provided.

The host memory 1130 is a memory provided in the host 1100. The host memory 1130 may store or output data requested by the host 1100. For example, the host memory 1130 may be implemented with a volatile memory such as a DRAM or an SRAM. However, the host memory 1130 may be variously implemented depending on purposes and may be implemented with a nonvolatile memory.

The host memory buffer 1120 may refer to a partial region of the host memory 1130, which is allocated to the storage device 1200 so as to be used as a buffer of the storage device 1200. That is, the storage device 1200 may use the host memory buffer 1120 as an internal buffer. An internal buffer provided in the storage device 1200 may be difficult to provide a sufficient capacity due to various issues such as costs, a device size, and limit on design. However, the host 1100 according to an example embodiment of the disclosure may allocate a partial region of the host memory 1130 to the storage device 1200 such that the storage device 1200 uses the partial region, and thus, the storage device 1200 may secure a sufficient buffer capacity.

The host memory buffer 1120 may be divided into the plurality of HMB regions 1122, 1124, and 1126 depending on various criteria.

In an example embodiment, the host memory buffer 1120 may be divided into the plurality of HMB regions 1122, 1124, and 1126 depending on the access frequency of data to be stored. For example, data of the storage device 1200, which have the high access frequency, may be stored in the first HMB region 1122; data of the storage device 1200, which have the medium access frequency, may be stored in the second HMB region 1124; data of the storage device 1200, which have the low access frequency, may be stored in the third HMB region 1126.

Also, in an example embodiment, the host memory buffer 1120 may be divided into the plurality of HMB regions 1122, 1124, and 1126 depending on the kind of data to be stored. For example, mapping data of the storage device 1200 may be stored in the first HMB region 1122; user data of the storage device 1200 may be stored in the second HMB region 1124; management data of the storage device 1200 may be stored in the third HMB region 1126. Meanwhile, the host memory buffer 1120 may be divided into the plurality of HMB regions 1122, 1124, and 1126 depending on various criteria including a degradation level of memory cells, in addition to the attributes of data to be stored.

The retention may occur in some of the plurality of HMB regions 1122, 1124, and 1126 of the host memory buffer 1120. In this case, the host 1100 may send the retention command for the HMB region, in which the retention occurs, from among the plurality of HMB regions 1122, 1124, and 1126 to the storage device 1200 (refer to FIG. 1). The storage device 1200 may receive the retention command for the HMB region, and the operation mode controller 1243 (refer to FIG. 1) may select an operation mode for the HMB region, in which the retention occurs, based on the retention command.

Figure 3:
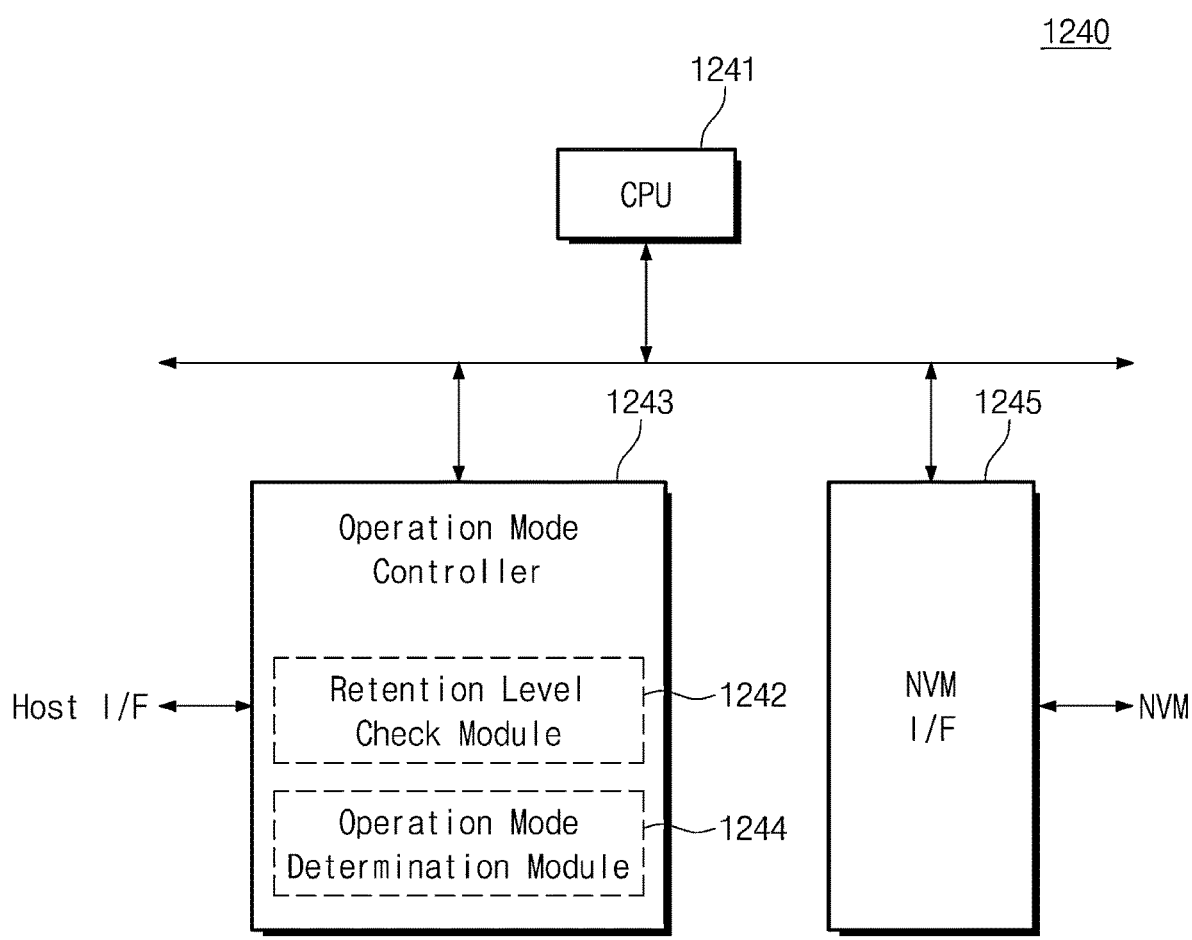
FIG. 3 is a block diagram illustrating a configuration of a storage controller of FIG. 1.

FIG. 3 is a block diagram illustrating a configuration of the storage controller 1240 of FIG. 1. Referring to FIG. 3, the storage controller 1240 includes a central processing unit (CPU) 1241, the operation mode controller 1243, and a flash interface 1245.

The CPU 1241 may control an overall operation of the storage device 1200. For example, the CPU 1241 may control the flash interface 1245 in response to a command from the host 1100 for the purpose of writing data in the nonvolatile memory device 1260 or reading data stored in the nonvolatile memory device 1260.

The operation mode controller 1243 receives the retention command for the host memory buffer 1120 through the host interface 1220 (refer to FIG. 1). The operation mode controller 1243 checks the retention level of the host memory buffer 1120 and select the best mode from the plurality of operation modes for the host memory buffer 1120 based on a check result. To this end, the operation mode controller 1243 may include a retention level check module 1242 and an operation mode determination module 1244.

The retention level check module 1242 checks the retention level of the host memory buffer 1120, which is included in the retention command. For example, when the host memory buffer 1120 is divided into a plurality of HMB regions, the retention level check module 1242 may check the retention level of an HMB region, in which the retention occurs, from among the plurality of HMB regions.

The operation mode determination module 1244 may select the best mode from the operation modes of the host memory buffer 1120 based on the retention level and may use the host memory buffer 1120, in which the retention occurs, depending on the selected mode.

For example, as will be described below, the operation mode determination module 1244 may select one of first to third modes Mode1 to Mode3 depending on the retention level. When the first mode Mode1 is selected, the operation mode determination module 1244 may permit the storage device 1200 to access the host memory buffer 1120 where the retention occurs. When the second mode Mode2 is selected, the operation mode determination module 1244 may permit the storage device 1200 to access the host memory buffer 1120 where the retention occurs; in this case, the operation mode determination module 1244 may retrieve frequently used data from the host memory buffer 1120 where the retention occurs and may store the retrieved data, that is, the frequently used data in the storage device 1200. When the third mode Mode3 is selected, the operation mode determination module 1244 may not permit the storage device 1200 to access the host memory buffer 1120 where the retention occurs.

According to various example embodiment, functional blocks illustrated in the disclosure, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Figure 4:
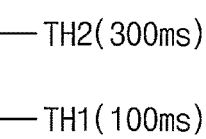
FIG. 4 is a diagram illustrating an example of a retention command.

FIG. 4 is a diagram illustrating an example of a retention command. For convenience of description, in FIG. 4, it is assumed that the host memory buffer 1120 is divided into the first HMB region, the second HMB region, and the third HMB region and the retention occurs in each of the first HMB region, the second HMB region, and the third HMB region.

Referring to FIG. 4, the retention command includes the address ADDR of the host memory buffer 1120, at which the retention occurs, and the retention level.

The retention level may be subdivided into a plurality of levels depending on a delay degree of a response speed. The host 1100 (refer to FIG. 1) may determine the retention level of the host memory buffer 1120 where the retention occurs, based on the delay degree of the response speed of the host memory buffer 1120.

For example, as illustrated in FIG. 4, it is assumed that expected response times of the first HMB region, the second HMB region, and the third HMB region are 500 ms, 200 ms, and 90 ms, respectively. Also, it is assumed that a first reference response time TH1 is 100 ms and a second reference response time TH2 is 300 ms.

The expected response time of the first HMB region HMB1 that is 500 ms is greater than 300 ms being the second reference response time TH2. In this case, the host 1100 may determine that the response speed of the first HMB region HMB1 is very slow and may determine the retention level of the first HMB region HMB1 to be "X". Herein, the retention level of "X" may indicate that an HMB region is incapable of being used as a host memory buffer. When the retention level is "X", the operation mode determination module 1244 (refer to FIG. 3) may select the third mode Mode3 as the operation mode of the first HMB region HMB1. As such, the access of the storage device 1200 to the first HMB region HMB1 may be blocked.

The expected response time of the second HMB region HMB2 that is 200 ms is greater than 100 ms being the first reference response time TH1 and is smaller than 300 ms being the second reference response time TH2. In this case, the host 1100 may determine that the response speed of the second HMB region HMB2 is moderately slow (or corresponds to a medium level) and may determine the retention level of the second HMB region HMB2 to be "1". When the retention level is "1", the operation mode determination module 1244 may select the second mode Mode2 as the operation mode of the second HMB region HMB2. As such, the access of the storage device 1200 to the second HMB region HMB2 may be permitted, but the frequently used data may be retrieved from the second HMB region HMB2 and may be stored in the storage device 1200.

The expected response time of the third HMB region HMB3 that is 90 ms is smaller than 100 ms being the first reference response time TH1. In this case, the host 1100 may determine that the response speed of the third HMB region HMB3 is a little slow and may determine the retention level of the third HMB region HMB3 to be "2". When the retention level is "2", the operation mode determination module 1244 may select the first mode Mode1 as the operation mode of the third HMB region HMB3. As such, the access of the storage device 1200 to the third HMB region HMB3 may be permitted, and the third HMB region HMB3 may be continuously used as an internal buffer regardless of whether the retention occurs.

As described above, the host 1100 according to an example embodiment of the disclosure may set the retention level of the host memory buffer 1120 depending on the delay degree of the response speed. In addition, the operation mode controller 1243 may select the best operation mode for the host memory buffer 1120 based on the retention level.

Figure 5:
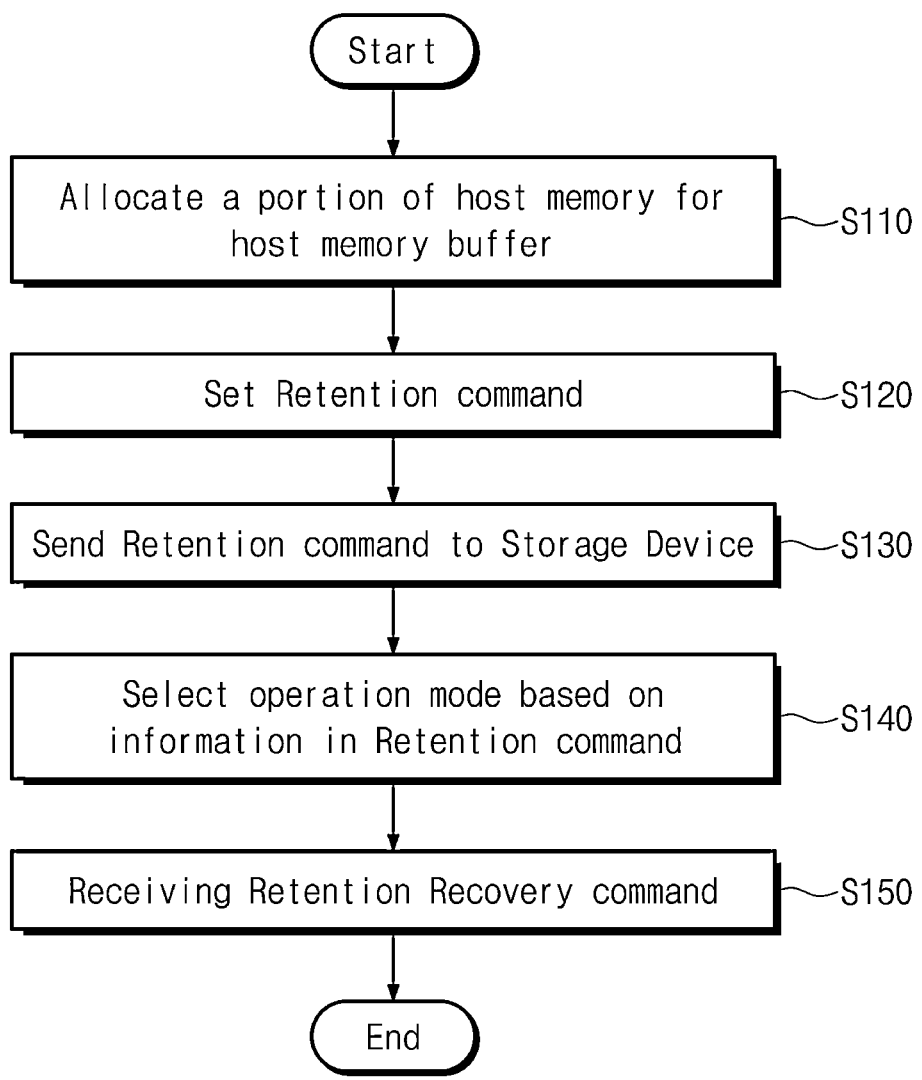
FIG. 5 is a flowchart associated with an operation of a memory system of FIG. 1.

FIG. 5 is a flowchart illustrating an example of an operation of the memory system 1000A of FIG. 1.

In operation S110, the host 1100 may allocate a partial region of the host memory 1130 for the host memory buffer 1120 to be used by the storage device 1200.

In operation S120, the host 1100 sets the retention command based on the response speed of the host memory buffer 1120 where the retention occurs.

In operation S130, the host 1100 sends the retention command to the storage device 1200.

In operation S140, the storage device 1200 receives the retention command and selects an operation mode of the host memory buffer 1120 based on the received retention command.

In operation S150, the storage device 1200 receives a retention recovery command from the host 1100. As such, an operation in which the storage device 1200 uses the host memory buffer 1120 as an internal buffer is resumed.

Figure 6:
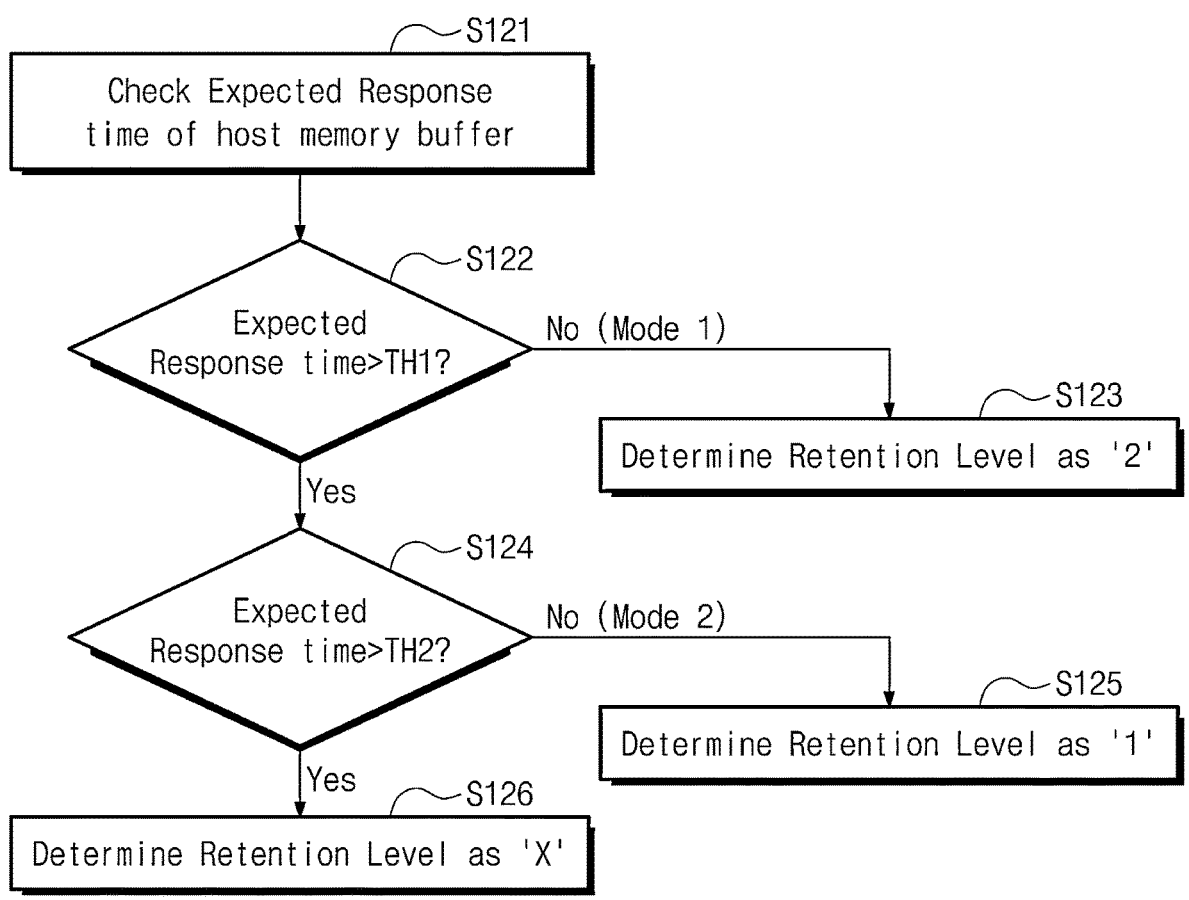
FIG. 6 is a flowchart illustrating an example of operation S120 of FIG. 5, in which a host sets a retention command.

FIG. 6 is a flowchart illustrating an example of operation S120 of FIG. 5, in which the host 1100 sets the retention command. For convenience of description, in FIG. 6, it is assumed that the retention level is set based on the first and second reference response times TH1 and TH2 as described with reference to FIG. 4.

In operation S121, the host 1100 checks the expected response time of the host memory buffer 1120 where the retention occurs.

In operation S122, the host 1100 determines whether the expected response time is greater than the first reference response time TH1.

When the expected response time is smaller than the first reference response time TH1, the host 1100 determines the retention level of the host memory buffer 1120 to be "2" (S123). In contrast, when the expected response time is greater than the first reference response time TH1, the host 1100 determines whether the expected response time is greater than the second reference response time TH2 (S124).

When the expected response time is smaller than the second reference response time TH2, the host 1100 determines the retention level of the host memory buffer 1120 to be "1" (S125). In contrast, when the expected response time is greater than the second reference response time TH2, the host 1100 determines the retention level of the host memory buffer 1120 to be "X" (S126).

As described above, the host 1100 may set the retention level depending on the response speed of the host memory buffer 1120 where the retention occurs.

Figure 7:
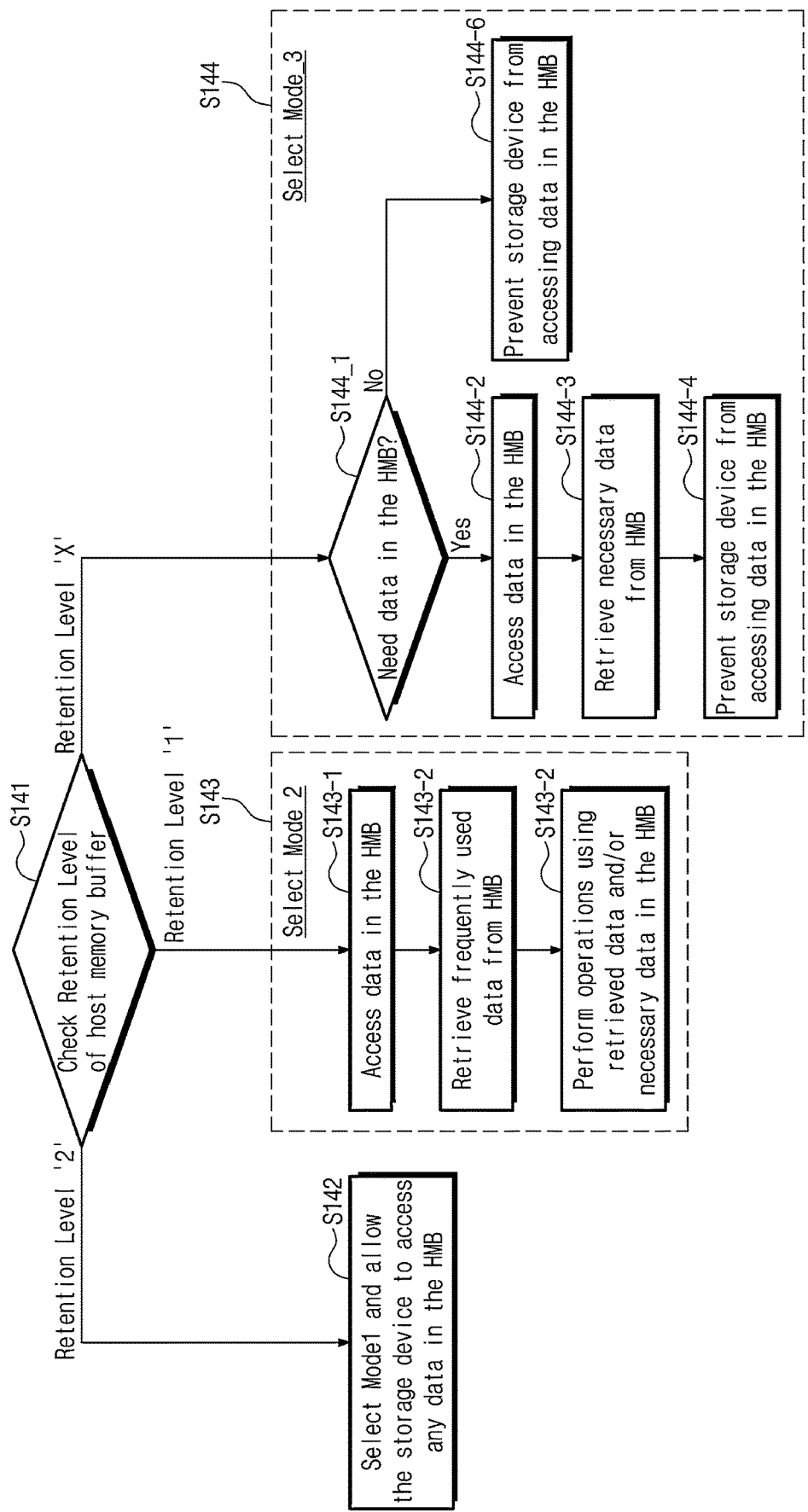
FIG. 7 is a flowchart illustrating an example of operation S140 of FIG. 5, in which a storage device sets an operation mode.

FIG. 7 is a flowchart illustrating an example of operation S140 of FIG. 5, in which the storage device 1200 sets an operation mode. For convenience of description, it is assumed that the retention command in which the retention level is "2", "1", or "X" is received.

In operation S141, the storage device 1200 checks the retention level of the host memory buffer 1120. When the retention level is "2", operation S142 in which the first mode Mode1 is selected is performed. When the retention level is "1", operation S143 in which the second mode Mode2 is selected is performed. When the retention level is "X", operation S144 in which the third mode Mode3 is selected is performed.

In operation S142, the storage device 1200 selects the first mode Mode1. In this case, the storage device 1200 may access the host memory buffer 1120 where the retention occurs. That is, because the influence that the decrease in the response speed due to the retention affects the overall performance is slight, the storage device 1200 may continuously use the host memory buffer 1120 as an internal buffer regardless of whether the retention occurs.

In operation S143, the storage device 1200 selects the second mode Mode2. In this case, the storage device 1200 may access the host memory buffer 1120 where the retention occurs, but the access to the host memory buffer 1120 may be minimized for a smooth operation. To this end, the storage device 1200 may retrieve the frequently used data from the host memory buffer 1120 and may store the retrieved data.

In detail, in operation S143_1, the storage device 1200 may access the host memory buffer 1120. In operation S143_2, the storage device 1200 may retrieve the frequently used data from the host memory buffer 1120 and may store the retrieved data. In operation S143_3, the storage device 1200 may perform various kinds of background operations by using the retrieved data. Also, if necessary, the storage device 1200 may again access the host memory buffer 1120 and may further retrieve necessary data.

Meanwhile, in operation S144, the storage device 1200 selects the third mode Mode3. In this case, the storage device 1200 may not permit (or may prevent) the access to the host memory buffer 1120 where the retention occurs. However, depending on whether there is a need to retrieve data necessary in the background operation, the access of the storage device 1200 to the host memory buffer 1120 may be prevented (or blocked) after the necessary data are retrieved.

In detail, in operation S144_1, the storage device 1200 determines whether data necessary for the background operation or the like are present in the host memory buffer 1120.

When it is determined that there are no necessary data, the storage device 1200 may be prevented from accessing the host memory buffer 1120 (S144_6). In this case, the storage device 1200 may enter a deep sleep state or may perform the background operation by using previously stored data.

In contrast, when it is determined that there are necessary data, the storage device 1200 may access the host memory buffer 1120 (S144_2). Afterwards, the storage device 1200 may retrieve data necessary in the background operation from the host memory buffer 1120 and may store the retrieved data therein (S144_3). Afterwards, the access of the storage device 1200 to the host memory buffer 1120 may be prevented (S144_4), and the storage device 1200 may perform the background operation by using the retrieved data.

As described above, the storage device 1200 may select the best mode from the operation modes of the host memory buffer 1120 based on the retention level of the host memory buffer 1120 and may use the host memory buffer 1120 in the selected mode.

FIG. 8 is a diagram for describing a command transfer operation between a host and a storage controller when the retention occurs according to a related art example. FIGS. 9A to 9E are diagrams for describing a command transfer operation between a host and a storage controller when the retention occurs according to different modes. For clear description, how commands are sent between a related art host and a related art storage controller will be described with reference to FIG. 8, and how commands are sent between the host 1100 (refer to FIG. 1) and the storage controller 1240 (refer to FIG. 1) according to an example embodiment of the disclosure will be described with reference to FIGS. 9A to 9E.

First, referring to FIG. 8, in operation S10, the host sets a bit of each of an enable host memory (EHM) command and a memory return (MR) command to "1". As such, an operation of returning a host memory buffer to the host is performed with the host memory buffer enabled.

Before the host memory buffer is disabled, in operation S20, the storage controller retrieves data present in the host memory buffer.

In operation S30, the host sets the bit of the EHM command and the bit of the MR command to "0" and "1", respectively. As such, the host memory buffer is disabled, and the host memory buffer is returned.

In operation S40, the storage controller enters the deep sleep state or performs the background operation. In this case, because the host memory buffer is already returned, the storage controller fails to use the data present in the host memory buffer.

In operation S50, the host memory buffer is recovered from the retention. In this case, the host sets the bit of the EHM command and the bit of the MR command regardless of "1" and "0", respectively. As such, the host again allocate the host memory buffer to the storage controller, and the corresponding host memory buffer is enabled.

In operation S60, the storage controller performs a rebuilding operation such that necessary data are again stored in the host memory buffer.

According to the above description, the related art memory system provides only set feature commands such as the EHM command and the MR command but does not provide the retention command according to an example embodiment of the disclosure. Accordingly, when there occurs the retention that the response speed of the host memory buffer is slower than the normal speed, in general, the conventional memory system disables the host memory buffer and returns the host memory buffer where the retention occurs.

In this case, the related art memory system has to retrieve all the data present in the host memory buffer before the host memory buffer is disabled. Accordingly, a time delay (i.e., a latency) according to the retrieving operation may occur. In addition, when the recovery from the retention is made, the related art memory system has to perform the rebuilding operation in which the host memory buffer is again allocated and data are again stored in the host memory buffer. Accordingly, a latency according to the rebuilding operation may also occur.

Figure 9A:
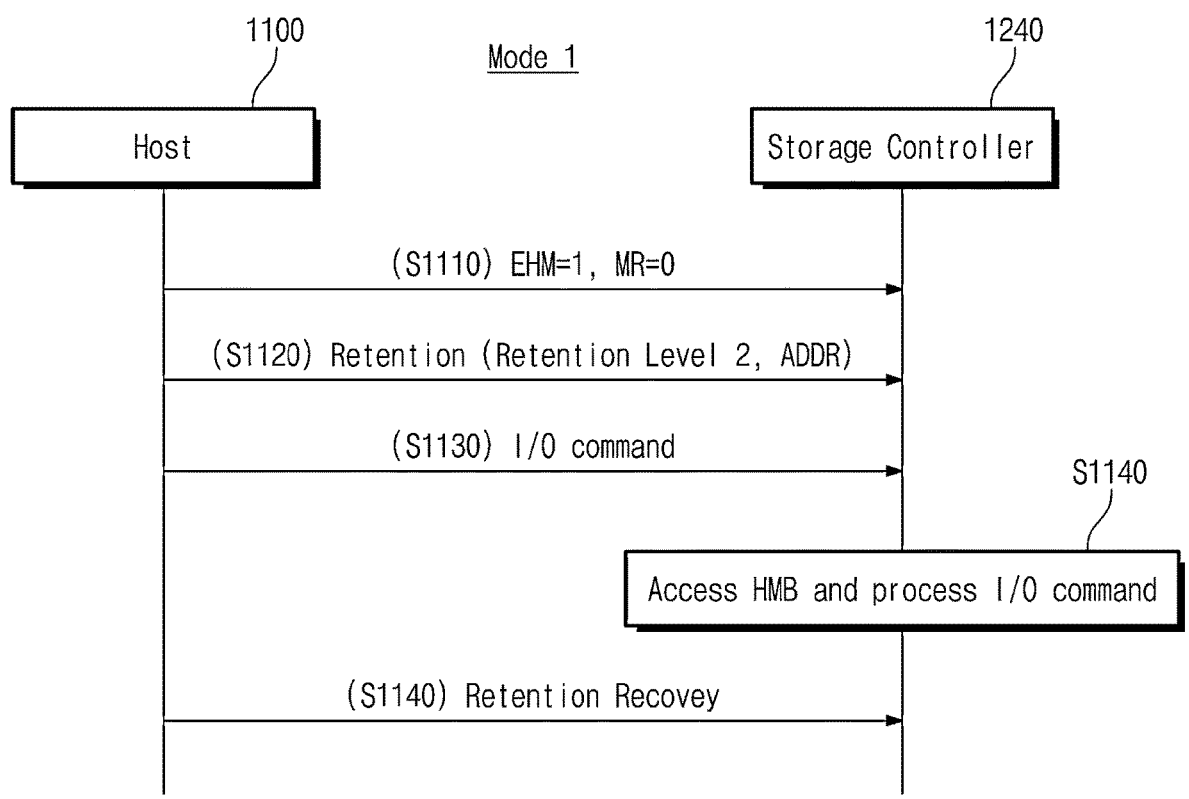

FIG. 9A is a diagram illustrating an example of an operation in which commands are sent between the host 1100 and the storage controller 1240 according to an example embodiment of the disclosure. An operation in which a command is sent in the first mode Mode1 described with reference to FIG. 7 will be described with reference to FIG. 9A.

In operation S1110, the host 1100 sets the bit of the EHM command and the bit of the MR command to "1" and "0", respectively. The following operation will be performed with the host memory buffer HMB enabled. In addition, the host memory buffer HMB is not returned.

In operation S1120, the host 1100 sends the retention command to the storage controller 1240. The retention command includes an address of the host memory buffer HMB, at which the retention occurs, and a retention level. For example, like FIG. 7, it is assumed that the retention level is "2". In this case, the storage controller 1240 determines that the retention level is "2" and selects the first mode Mode1 as the operation mode of the host memory buffer HMB. Accordingly, the storage controller 1240 continuously uses the host memory buffer HMB regardless of the occurrence of the retention.

In operation S1130, the host 1100 sends an I/O command to the storage controller 1240.

In operation S1140, the storage controller 1240 processes the I/O command received from the host 1100. In this case, the storage controller 1240 may access the host memory buffer HMB without the restriction.

In operation S1150, the host 1100 sends the retention recovery command to the storage controller 1240.

As described above, in the first mode Mode1, the storage controller 1240 according to an example embodiment of the disclosure continuously uses the host memory buffer HMB as an internal buffer without returning the host memory buffer HMB. Accordingly, unlike the related art memory system of FIG. 8, the storage controller 1240 according to an example embodiment of the disclosure does not need to perform the operation of retrieving the data present in the host memory buffer HMB. As a result, the latency due to the operation of retrieving data from the host memory buffer HMB may be prevented.

In addition, because the host memory buffer HMB is continuously used as an internal buffer, the storage controller 1240 according to an example embodiment of the disclosure does not need to perform the operation of rebuilding the host memory buffer HMB (i.e., operation S60 of FIG. 8). Accordingly, the latency due to the operation of rebuilding the host memory buffer HMB may be prevented.

FIG. 9B is a diagram illustrating an example of an operation in which commands are sent between the host 1100 and the storage controller 1240 according to an example embodiment of the disclosure. An example of an operation in which a command is sent in the second mode Mode2 described with reference to FIG. 7 will be described with reference to FIG. 9B.

In operation S1210, the host 1100 sets the bit of the EHM command and the bit of the MR command to "1" and "0", respectively. The following operation will be performed with the host memory buffer HMB enabled.

In operation S1220, the host 1100 sends the retention command to the storage controller 1240. For example, like FIG. 7, it is assumed that the retention level is "1". In this case, the storage controller 1240 may determine that the retention level is "1" and may select the second mode Mode2 corresponding to the retention level of "1" as the operation mode of the host memory buffer HMB.

In operation S1230, the storage controller 1240 retrieves the frequently used data from the host memory buffer HMB and stores the retrieved data in the storage device 1200.

In operation S1240, the storage controller 1240 performs the background operation by using the retrieved data. In this case, when data necessary in the background operation are required, the storage controller 1240 may again access the host memory buffer HMB and may further retrieve the necessary data. However, because the frequently used data are already retrieved in operation S1230, the access of the storage controller 1240 to the host memory buffer HMB may be minimized.

In operation S1250, the host 1100 sends the retention recovery command to the storage controller 1240.

In operation S1260, the storage controller 1240 updates contents in the host memory buffer HMB.

As described above, in the second mode Mode2, the storage controller 1240 according to an example embodiment of the disclosure operates such that there is minimized the access of the storage controller 1240 to the host memory buffer HMB where the retention occurs. In particular, the related art storage controller of FIG. 8 may retrieve all the data present in the host memory buffer, whereas the storage controller 1240 according to an example embodiment of the disclosure may retrieve only the frequently used data from the host memory buffer HMB. Accordingly, the latency due to the operation of retrieving data may decrease.

In addition, the host 1100 according to an example embodiment of the disclosure continuously sets the bit of the MR command to "0". Accordingly, the host memory buffer HMB is not returned, and thus, the data present in the host memory buffer HMB are continuously maintained. Accordingly, the related art storage controller of FIG. 8 should again store all the data in a newly allocated host memory buffer, whereas the storage controller 1240 according to an example embodiment of the disclosure may update only the changed data (or may incorporate only the changed data in the host memory buffer). As a result, a time taken to resume the host memory buffer HMB may decrease.

Figure 9C:
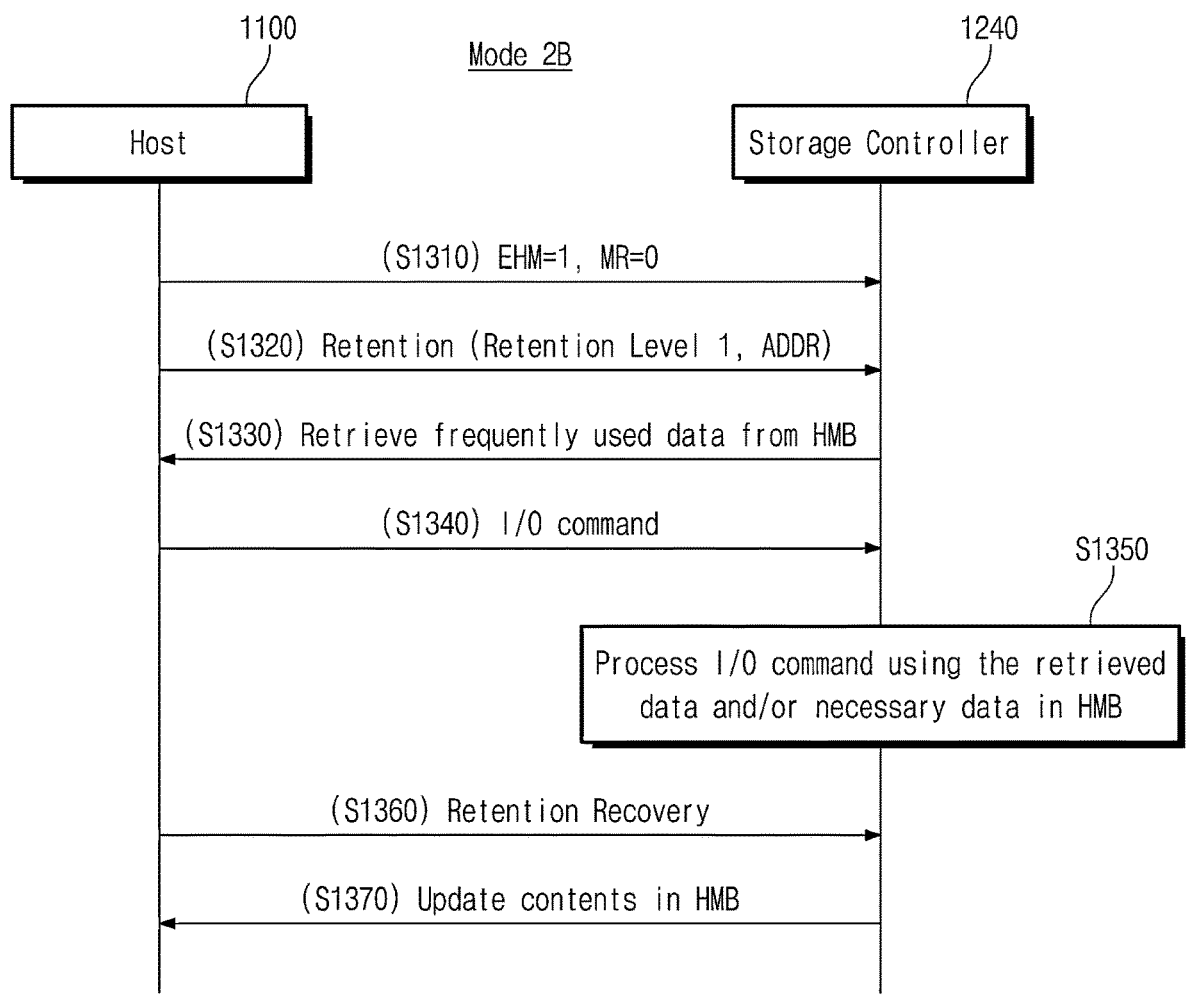

FIG. 9C is a diagram illustrating an example of an operation in which commands are sent between the host 1100 and the storage controller 1240 according to an example embodiment of the disclosure. Another example of an operation in which a command is sent in the second mode Mode2 described with reference to FIG. 7 will be described with reference to FIG. 9C. An operations to be described with reference to FIG. 9C is similar to the operation described with reference to FIG. 9B. Thus, additional description associated with the similar operation will be omitted to avoid redundancy.

In operation S1310, the host 1100 sets the bit of the EHM command and the bit of the MR command to "1" and "0", respectively.

In operation S1320, the host 1100 sends the retention command to the storage controller 1240. For example, it is assumed that the retention level is "1". In this case, the storage controller 1240 selects the second mode Mode2.

In operation S1330, the storage controller 1240 retrieves the frequently used data from the host memory buffer HMB and stores the retrieved data in the storage device 1200.

In operation S1340, the host 1100 sends the I/O command to the storage controller 1240.

In operation S1350, the storage controller 1240 processes the I/O command by using the retrieved data. In this case, when data necessary for the processing of the I/O command are required, the storage controller 1240 may again access the host memory buffer HMB and may further retrieve the necessary data. However, because the frequently used data are already retrieved in operation S1330, the access of the storage controller 1240 to the host memory buffer HMB may be minimized.

In operation S1360, the host 1100 sends the retention recovery command to the storage controller 1240.

In operation S1370, the storage controller 1240 updates the host memory buffer HMB.

As described above, in the second mode Mode2, the storage controller 1240 according to an example embodiment of the disclosure may process the I/O command in a state where there is minimized the access to the host memory buffer HMB where the retention occurs.

Figure 9D:
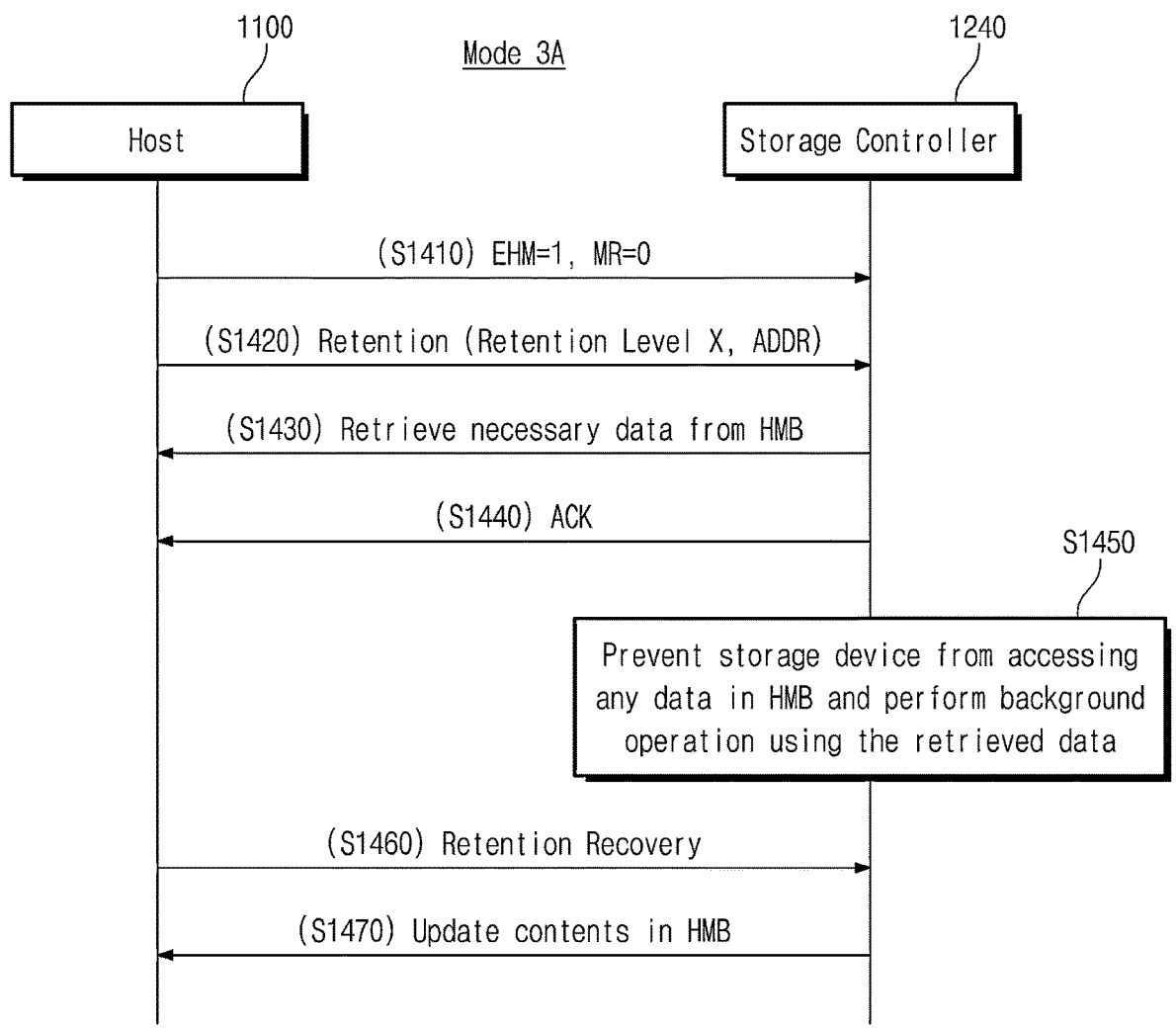

FIG. 9D is a diagram illustrating an example of an operation in which commands are sent between the host 1100 and the storage controller 1240 according to an example embodiment of the disclosure. An example of an operation in which a command is sent in the third mode Mode3 described with reference to FIG. 7 will be described with reference to FIG. 9D.

In operation S1410, the host 1100 sets the bit of the EHM command and the bit of the MR command to "1" and "0", respectively.

In operation S1420, the host 1100 sends the retention command to the storage controller 1240. For example, like FIG. 7, it is assumed that the retention level is "X". In this case, the storage controller 1240 selects the third mode Mode3.

In operation S1430, the storage controller 1240 retrieves data necessary in the background operation from the host memory buffer HMB and stores the retrieved data in the storage device 1200.

In operation S1440, the storage controller 1240 sends an acknowledge signal ACK, which provides notification that the necessary data are completely retrieved, to the host 1100. Afterwards, the access of the storage device 1200 to the host memory buffer 1120 is prevented.

In operation S1450, the storage controller 1240 performs the background operation. In this case, the access of the storage controller 1240 to the host memory buffer 1120 is prevented, and the storage controller 1240 performs the background operation only by using the retrieved data or the previously stored data.

In operation S1460, the host 1100 sends the retention recovery command to the storage controller 1240.

In operation S1470, the storage controller 1240 updates contents in the host memory buffer HMB.

As described above, in the third mode Mode3, the retention command that the host 1100 according to an example embodiment of the disclosure sets functions as an option for preventing the access of the storage controller 1240 to the host memory buffer HMB.

In general, when the host enters the power saving mode, the access of the storage controller to the host memory buffer may cause a wake-up of the host. This acts as a factor that halves the effect of the power saving mode. However, the retention command according to an example embodiment of the disclosure functions as the option for preventing the access of the storage controller 1240 to the host memory buffer HMB. Accordingly, when the host 1100 enters the power saving mode, the host 1100 may set the retention level of the retention command to "X", thus preventing the unintended occurrence of the wake-up in advance.

In addition, because the host 1100 according to an example embodiment of the disclosure does not return the host memory buffer HMB, a time taken to resume the host memory buffer HMB may decrease.

Figure 9E:
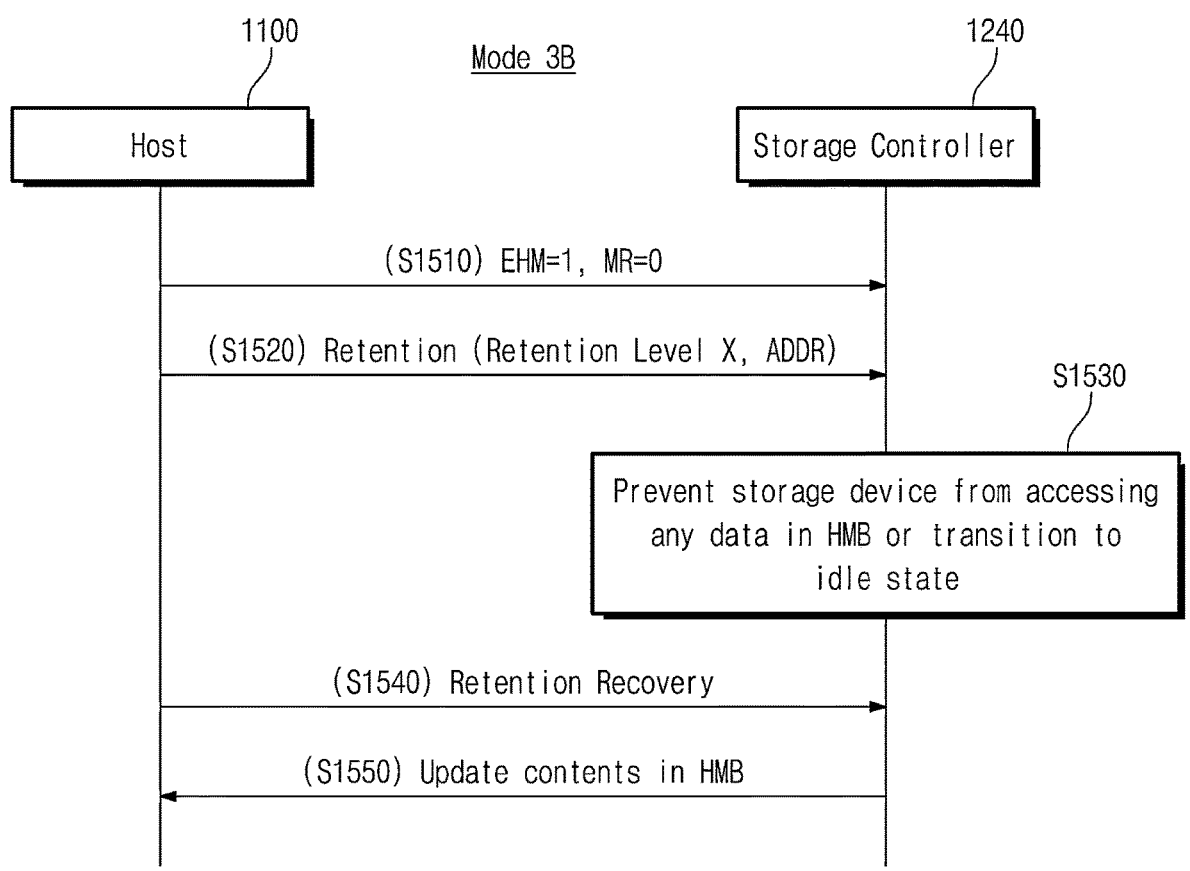

FIG. 9E is a diagram illustrating an example of an operation in which commands are sent between the host 1100 and the storage controller 1240 according to an example embodiment of the disclosure. Another example of an operation in which a command is sent in the third mode Mode3 described with reference to FIG. 7 will be described with reference to FIG. 9E. An operations to be described with reference to FIG. 9E is similar to the operation described with reference to FIG. 9D. Thus, additional description associated with the similar operation will be omitted to avoid redundancy.

In operation S1510, the host 1100 sets the bit of the EHM command and the bit of the MR command to "1" and "0", respectively.

In operation S1520, the host 1100 sends the retention command to the storage controller 1240. For example, it is assumed that the retention level is "X". In this case, the storage controller 1240 selects the third mode Mode3.

In operation S1530, the access of the storage controller 1240 to the host memory buffer HMB is prevented. As such, the storage controller 1240 may enter an idle state or may perform the background operation or the like by using the data previously stored in the storage device 1200.

In operation S1540, the host 1100 sends the retention recovery command to the storage controller 1240.

In operation S1550, the storage controller 1240 updates contents in the host memory buffer HMB.

As described above, in the third mode Mode3, the retention command may immediately prevent the access of the storage controller 1240 to the host memory buffer HMB.

Meanwhile, the above description is provided as an example, and the scope and spirit of the invention may be variously changed and applied. Below, application examples of the disclosure will be described.

Figure 10:
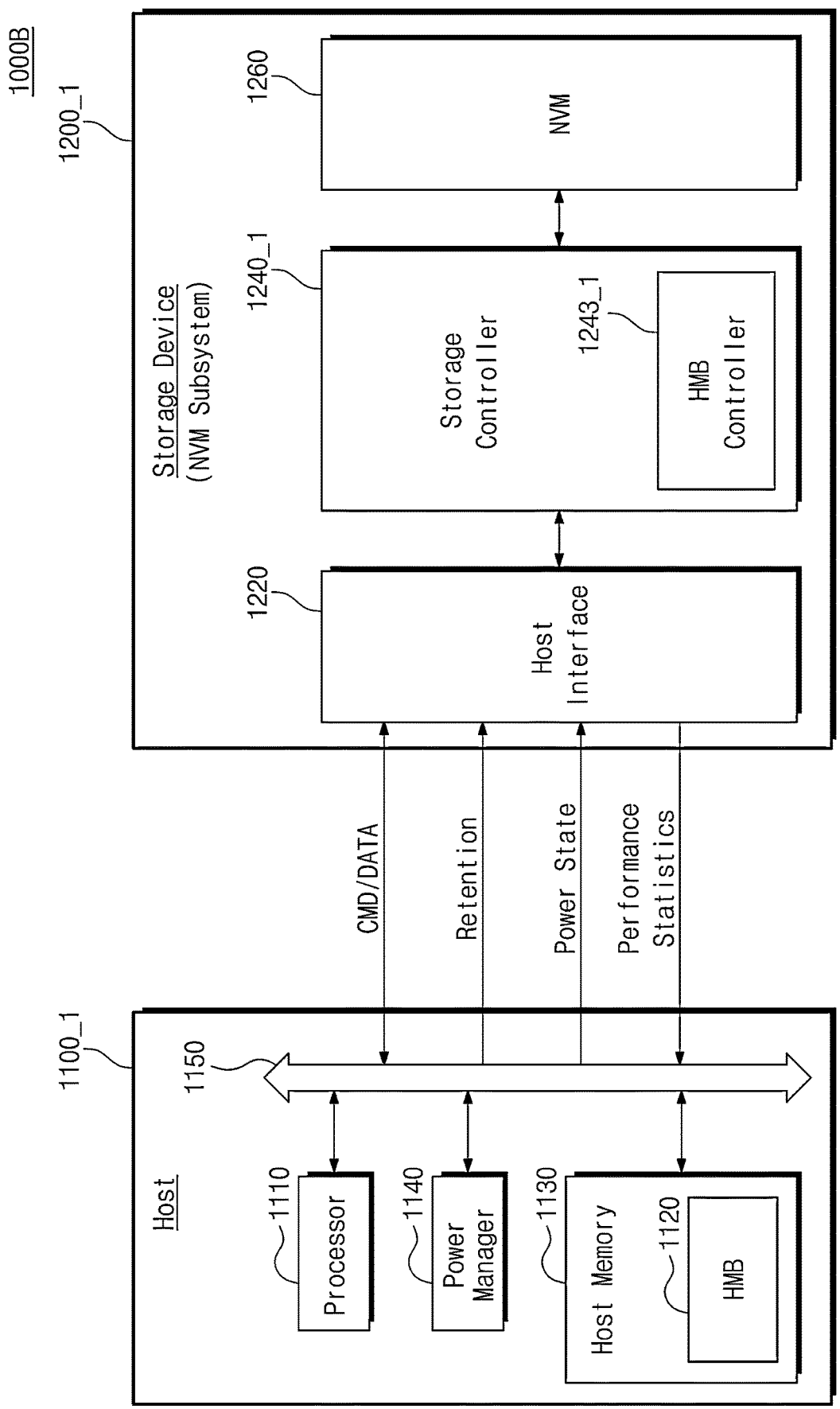
FIG. 10 is a block diagram illustrating an example of a memory system according to an example embodiment of the disclosure.
Figure 11:
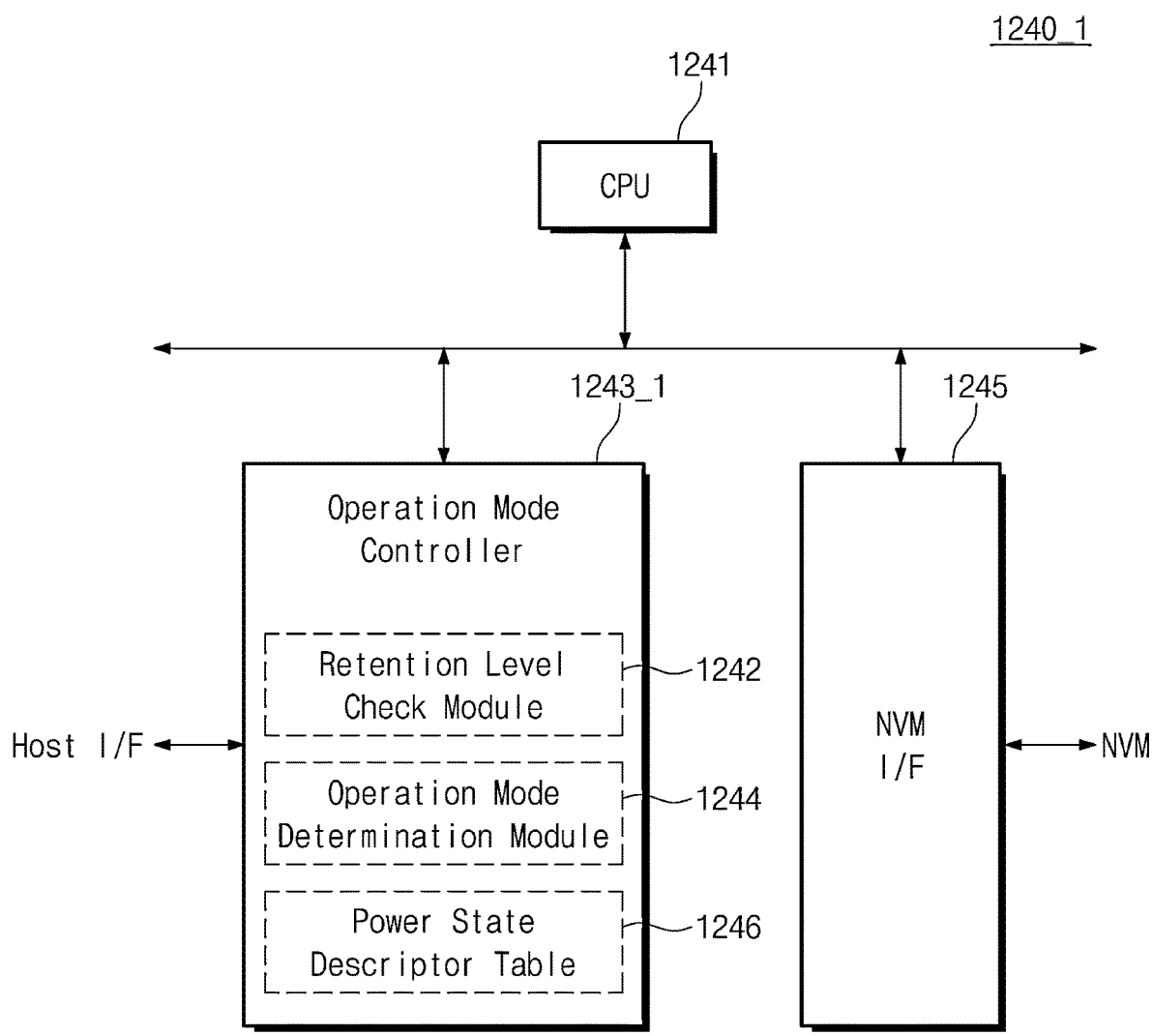
FIG. 11 illustrating an example of a storage controller of FIG. 10.

FIG. 10 is a block diagram illustrating an example of a memory system 1000B according to an example embodiment of the disclosure, and FIG. 11 illustrating an example of a storage controller 1240_1 of FIG. 10. The memory system 1000B of FIG. 10 is similar to the memory system 1000A of FIG. 1, and the storage controller 1240_1 of FIG. 11 is similar to the storage controller 1240 of FIG. 3. Accordingly, the same or like component may be marked by using the same or similar reference numerals/signs, and additional description associated with the same or like components will be omitted to avoid redundancy.

The memory system 1000B of FIG. 10 may additionally support a power management function. For example, the memory system 1000B may support a dynamic power management function, and a host 1100_1 may modify power states such that a storage device 1200_1 provides the best performance. To this end, the host 1100_1 may include a power manager 1140, and an operation mode controller 1243_1 may include a power state descriptor table 1246 as shown in FIG. 11.

The power manager 1140 receives information about performance statics from the storage device 1200_1. For example, the power manager 1140 may receive the information about the performance statics for each of power states that the storage controller 1240 supports. The information about the performance statics may include information about maximum power (MP), entry latency (ENLAT), exit latency (EXLAT), relative read throughput (RRT), relative read latency (RRL), relative write throughput (RWT), and relative write latency (RWL).

The power manager 1140 may select a power state capable of maximizing the performance of the storage device 1200_1, based on the performance statics for each of the power states. In particular, the power manager 1140 according to an example embodiment of the disclosure may select a power state based on the operation mode of the host memory buffer 1120. In this case, the operation mode of the host memory buffer 1120 may be provided to the power manager 1140 as performance objective. Also, as another example, the power manager 1140 may select a power state based on the retention level of the host memory buffer 1120. In this case, the retention command set by the host 1100_1 may be provided to the power manager 1140 as the performance objective.

The power state descriptor table 1246 manages the information about the performance statics for each of power states that the storage controller 1240_1 supports. For example, the storage controller 1240_1 may support a maximum of 32 power states, and the power state descriptor table 1246 may manage the performance statics (e.g., a maximum power (MP)) for each of the 32 power states.

As described above, the memory system 1000B according to an example embodiment of the disclosure additionally supports the power management function. In particular, the power manager 1140 may select the best power state from the plurality of power states based on the retention level of the host memory buffer 1120 where the retention occurs and/or the operation mode of the host memory buffer 1120. As a result, the host 1100_1 according to an example embodiment of the disclosure may control the storage device 1200_1 more accurately, and thus, the overall performance of the memory system 1000B may be improved.

FIGS. 12A to 12E are diagrams illustrating an example of an operation in which commands are sent between the host 1100_1 and the storage controller 1240_1 of FIG. 10. The operation of FIGS. 12A to 12E are similar to the operation of FIGS. 9A to 9E except that a power state command is additionally sent from the host 1100_1 to the storage controller 1240_1. Thus, additional description associated with the similar operation will be omitted to avoid redundancy.

Figure 12A:
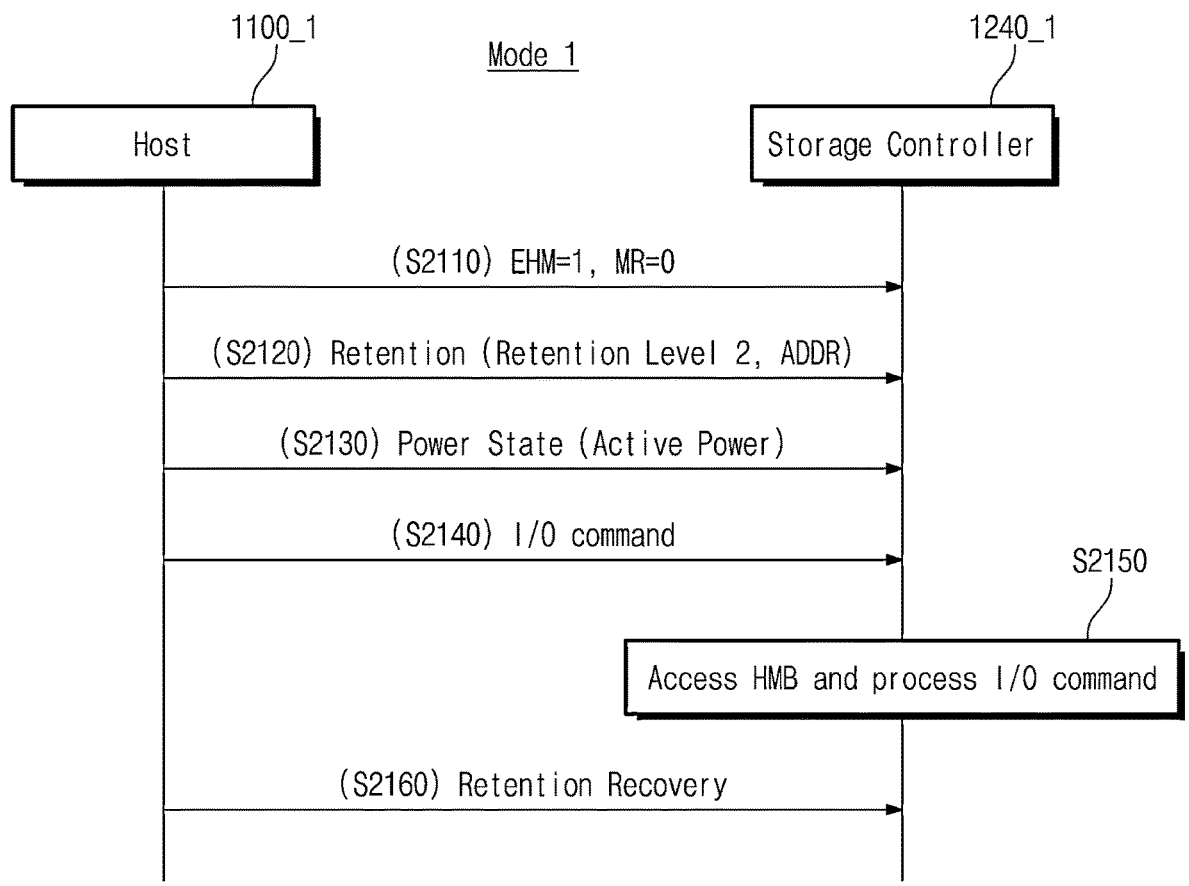
FIGS. 12A to 12E are diagrams illustrating an example of an operation in which commands are sent between a host and a storage controller of FIG. 10.

FIG. 12A is a diagram illustrating an example of an operation in which commands are sent between the host 1100_1 and the storage controller 1240_1 in the first mode Mode1.

In operation S2110, the host 1100_1 sets the bit of the EHM command and the bit of the MR command to "1" and "0", respectively.

In operation S2120, the host 1100_1 sends the retention command to the storage controller 1240_1. For example, it is assumed that the retention level of the host memory buffer HMB where the retention occurs is "2". In this case, the storage controller 1240_1 selects the first mode Mode1 as the operation mode of the host memory buffer HMB. Thus, the storage controller 1240_1 may access the host memory buffer HMB without the restriction.

In operation S2130, the host 1100_1 selects the active power state based on the retention level (i.e., "2") and/or the operation mode (i.e., the first mode Mode1) of the host memory buffer HMB and sends information about the active power state to the storage controller 1240_1. Herein, the active power state indicates a power state where the storage controller 1240_1 performs various operations including an operation of processing the I/O command.

In operation S2140, the host 1100_1 sends the I/O command to the storage controller 1240_1.

In operation S2150, the storage controller 1240_1 processes the I/O command received from the host 1100_1. In this case, the storage controller 1240_1 may access the host memory buffer HMB without the restriction and may obtain data necessary to process the I/O command.

In operation S2160, the host 1100_1 sends the retention recovery command to the storage controller 1240_1.

As described above, the memory system 1000B according to an example embodiment of the disclosure may select the operation mode of the host memory buffer HMB in consideration of the retention level and may also determine the power state of the storage controller 1240_1 in consideration of the retention level. Accordingly, it may be possible to control the storage controller 1240_1 more accurately. This may mean that the overall performance of the memory system 1000B is improved.

Figure 12B:
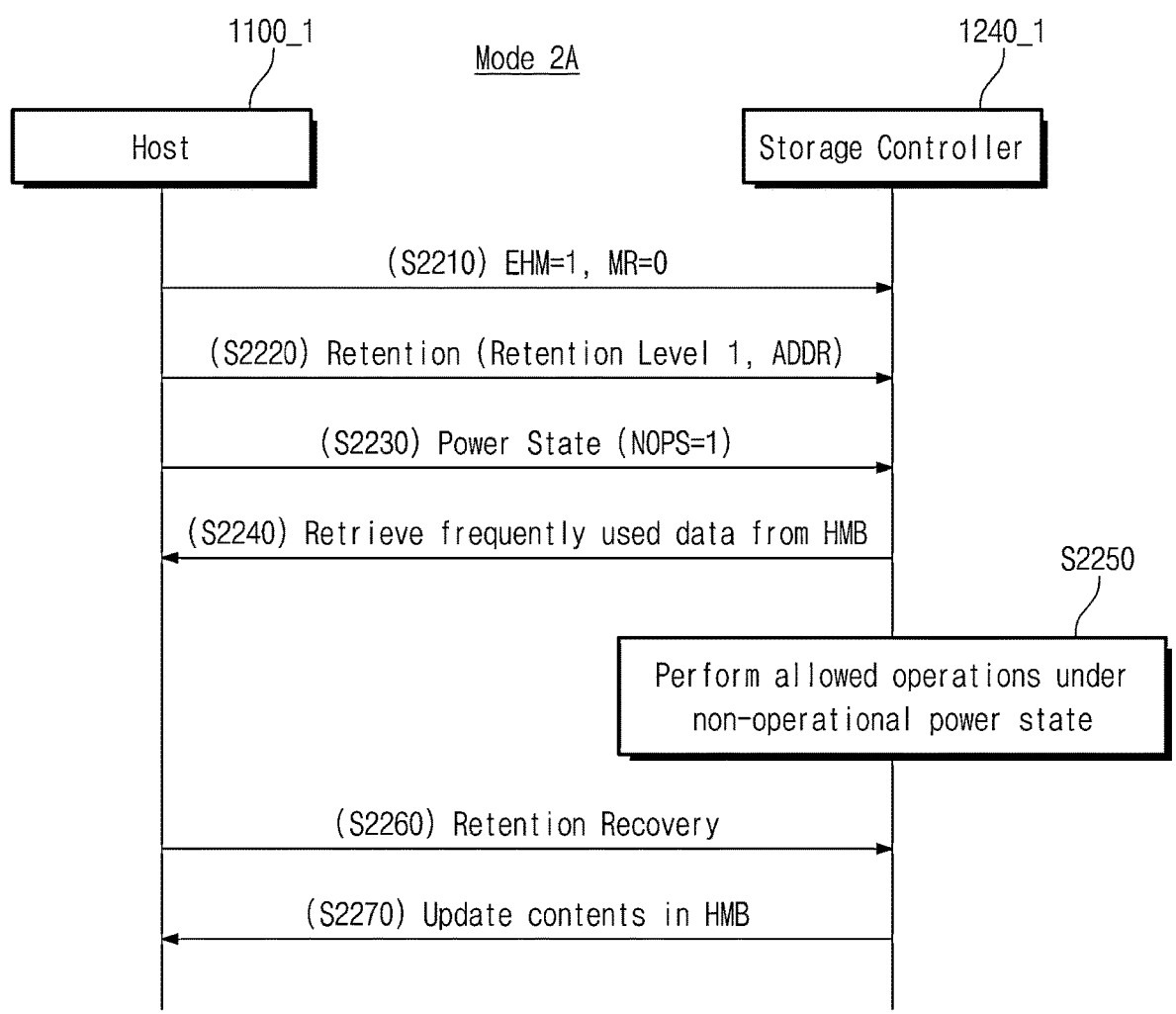

FIG. 12B is a diagram illustrating an example of an operation in which commands are sent between the host 1100_1 and the storage controller 1240_1 in the second mode Mode2.

In operation S2210, the host 1100_1 sets the bit of the EHM command and the bit of the MR command to "1" and "0", respectively.

In operation S2220, the host 1100_1 sends the retention command to the storage controller 1240_1. For example, it is assumed that the retention level is "1". In this case, the storage controller 1240_1 selects the second mode Mode2 as the operation mode of the host memory buffer HMB.

In operation S2230, the host 1100_1 selects a non-operational power state (NOPS) as a power state, based on the retention level (i.e., "1") and/or the operation mode (i.e., the second mode Mode2) of the host memory buffer HMB.

In operation S2240, the storage controller 1240_1 retrieves the frequently used data from the host memory buffer HMB and stores the retrieved data in the storage device 1200_1.

In operation S2250, the storage controller 1240_1 performs operations permitted in the non-operational power state, by using the retrieved data. For example, in the non-operational power state, the storage device 1200_1 may perform a persistent memory region (PMR) access operation, a controller memory buffer (CMB) access operation, a background operation, and the like but fails to process the I/O command.

In this case, if necessary, the storage controller 1240_1 may again access the host memory buffer HMB and may further retrieve the necessary data. However, because the frequently used data are already retrieved in operation S2240, the access of the storage controller 1240_1 1240 to the host memory buffer HMB may be minimized.

In operation S2260, the host 1100_1 sends the retention recovery command to the storage controller 1240_1.

In operation S2270, the storage controller 1240_1 updates contents in the host memory buffer HMB.

As described above, in the second mode Mode2, the storage controller 1240 according to an example embodiment of the disclosure operates such that there is minimized the access of the storage controller 1240 to the host memory buffer HMB where the retention occurs. In addition, the host 1100_1 according to an example embodiment of the disclosure may allow the storage device 1200_1 to operate in the non-operational power state.

Figure 12C:
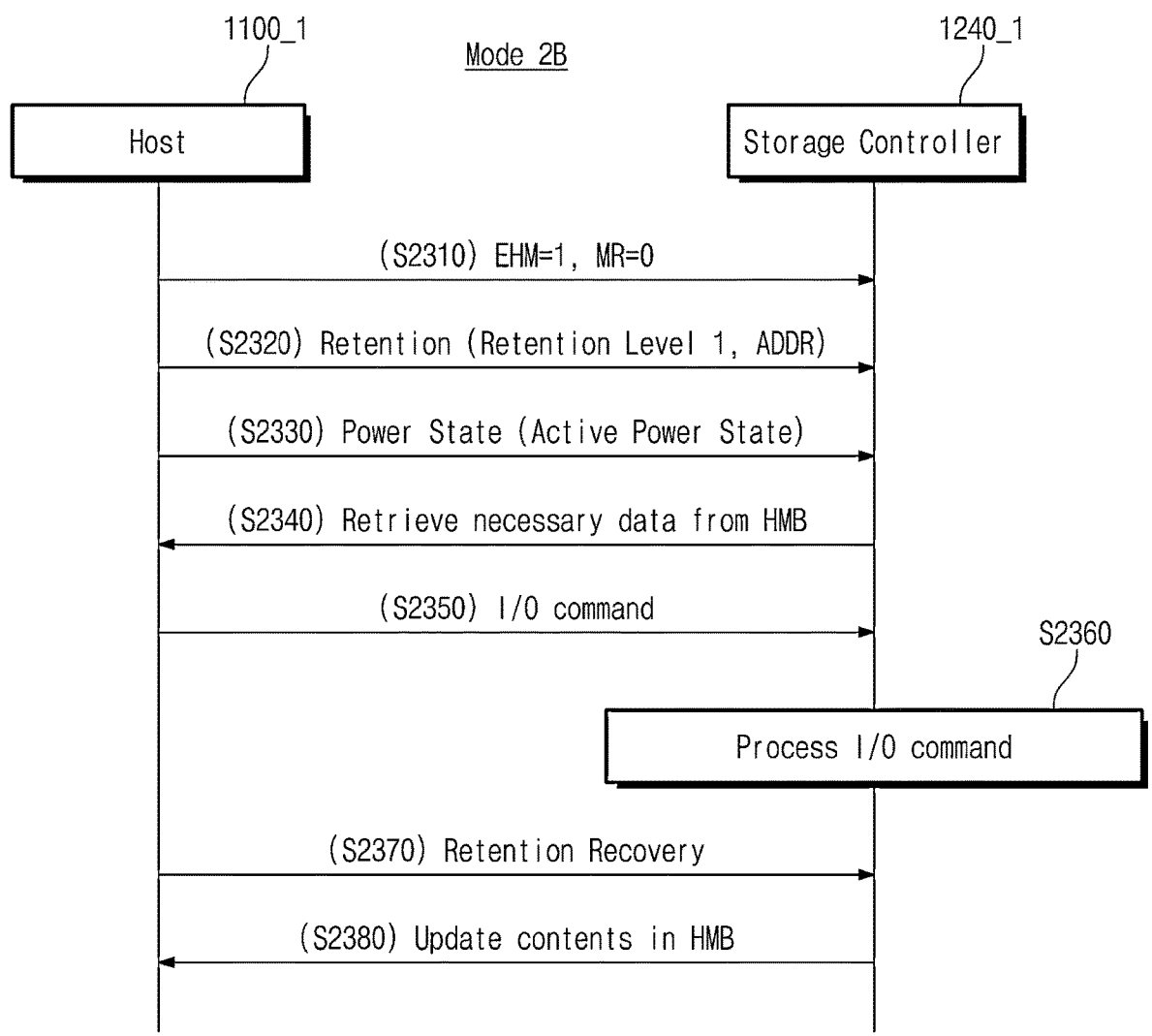

FIG. 12C is a diagram illustrating another example of an operation in which commands are sent between the host 1100_1 and the storage controller 1240_1 in the second mode Mode2.

In operation S2310, the host 1100_1 sets the bit of the EHM command and the bit of the MR command to "1" and "0", respectively.

In operation S2320, the host 1100_1 sends the retention command to the storage controller 1240_1. For example, it is assumed that the retention level is "1". In this case, the storage controller 1240_1 selects the second mode Mode2 as the operation mode of the host memory buffer HMB.

In operation S2330, the host 1100_1 selects the active power state as a power state appropriate for the storage controller 1240_1.

In operation S2340, the storage controller 1240_1 retrieves the frequently used data from the host memory buffer HMB and stores the retrieved data in the storage device 1200_1.

In operation S2350, the host 1100_1 sends the I/O command to the storage controller 1240_1.

In operation S2360, the storage controller 1240_1 processes the I/O command by using the retrieved data. In this case, when data necessary for the processing of the I/O command are required, the storage controller 1240_1 may again access the host memory buffer HMB and may further retrieve the necessary data. However, because the frequently used data are already retrieved in operation S2340, the access of the storage controller 1240_1 to the host memory buffer HMB may be minimized.

In operation S2370, the host 1100_1 sends the retention recovery command to the storage controller 1240_1.

In operation S2380, the storage controller 1240_1 updates contents in the host memory buffer HMB.

As described above, in the second mode Mode2, the storage controller 1240_1 may process the I/O command in a state where there is minimized the access to the host memory buffer HMB where the retention occurs; in this case, the host 1100_1 may select the active power state as a power state appropriate for the storage device 1200_1.

Figure 12D:
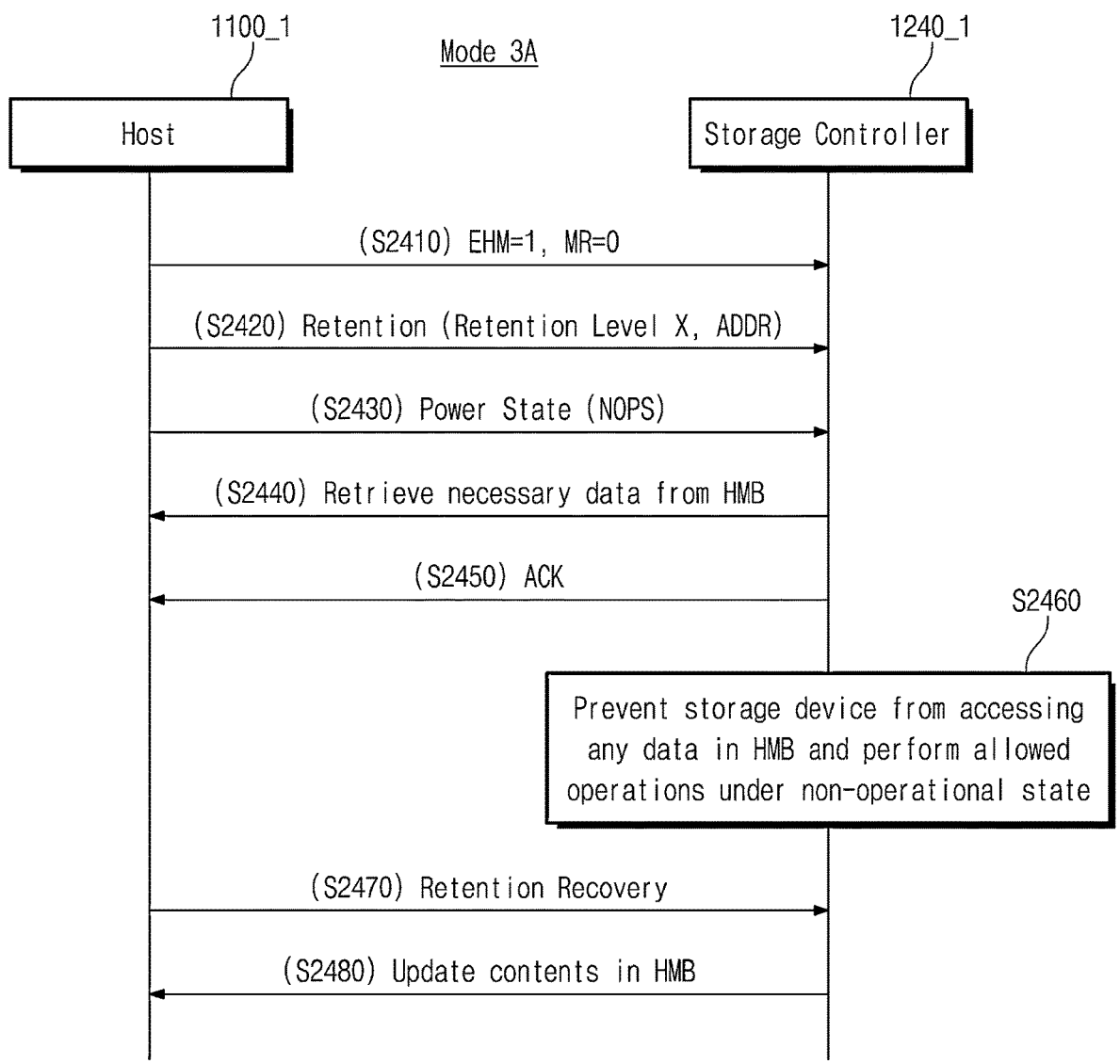

FIG. 12D is a diagram illustrating an example of an operation in which commands are sent between the host 1100_1 and the storage controller 1240_1 in the third mode Mode3.

In operation S2410, the host 1100_1 sets the bit of the EHM command and the bit of the MR command to "1" and "0", respectively.

In operation S2420, the host 1100_1 sends the retention command to the storage controller 1240_1. For example, it is assumed that the retention level is "X". In this case, the storage controller 1240 selects the third mode Mode3.

In operation S2430, the host 1100_1 selects the non-operational power state (NOPS) as a power state of the storage controller 1240_1, based on the retention level (i.e., "X") and/or the operation mode (i.e., the third mode Mode3) of the host memory buffer HMB.

In operation S2440, the storage controller 1240_1 retrieves data necessary in the non-operational power state from the host memory buffer HMB and stores the retrieved data in the storage device 1200_1.

In operation S2450, the storage controller 1240_1 sends the acknowledge signal ACK, which provides notification that the necessary data are completely retrieved, to the host 1100_1. Afterwards, the access of the storage device 1200_1 to the host memory buffer HMB is prevented.

In operation S2460, the storage controller 1240_1 performs the operation permitted in the non-operational power state, by using the retrieved data.

In operation S2470, the host 1100_1 sends the retention recovery command to the storage controller 1240_1.

In operation S2480, the storage controller 1240_1 updates contents in the host memory buffer HMB.

As described above, in the third mode Mode3, the retention command may function as an option for preventing the access of the storage controller 1240_1 to the host memory buffer HMB. In addition, the host 1100_1 may select the non-operational power state as a power state appropriate for the storage device 1200_1.

Figure 12E:
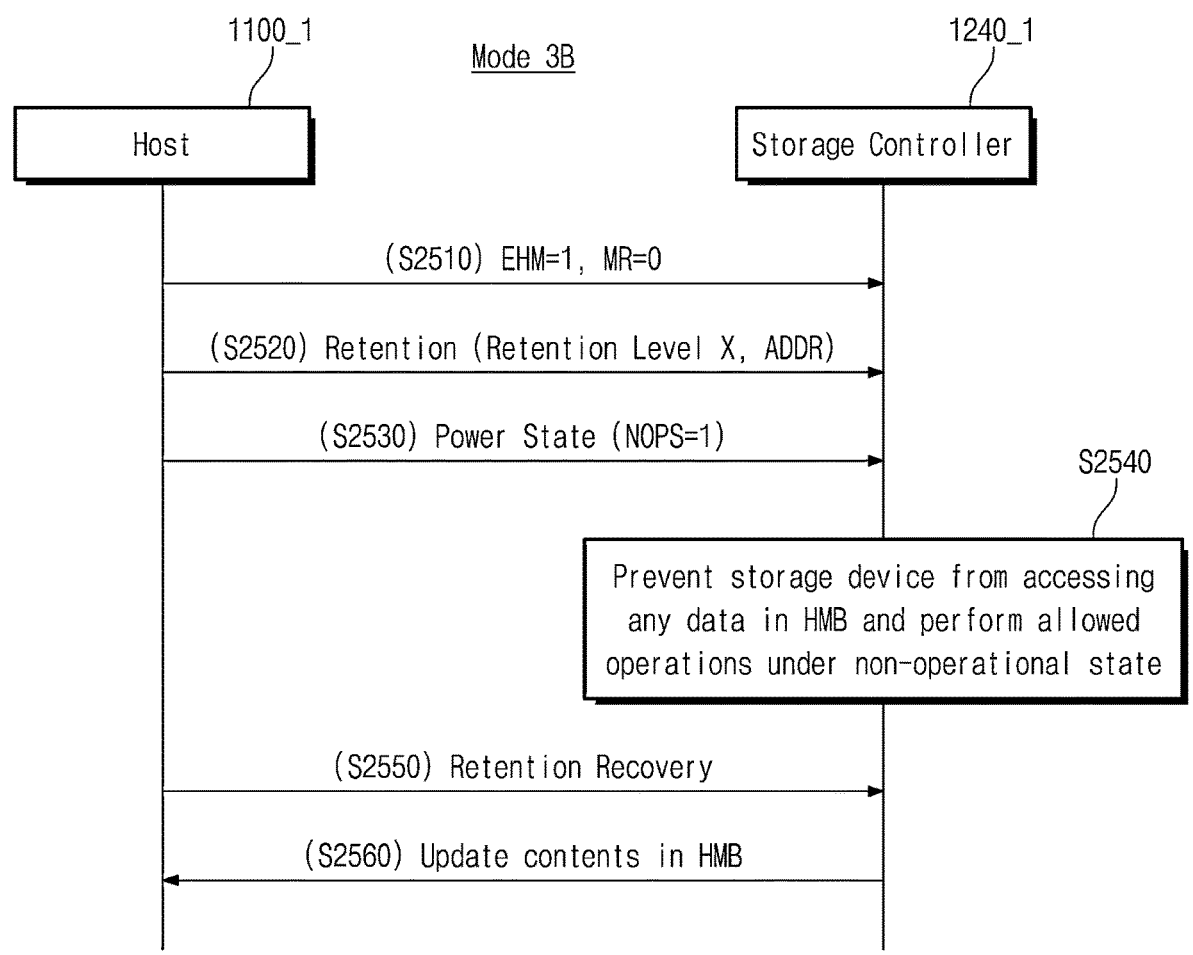

FIG. 12E is a diagram illustrating an example of an operation in which commands are sent between the host 1100_1 and the storage controller 1240_1 in the third mode Mode3.

In operation S2510, the host 1100_1 sets the bit of the EHM command and the bit of the MR command to "1" and "0", respectively.

In operation S2520, the host 1100_1 sends the retention command to the storage controller 1240_1. For example, it is assumed that the retention level is "X". In this case, the storage controller 1240_1 selects the third mode Mode3 as the operation mode of the host memory buffer HMB.

In operation S2430, the host 1100_1 selects the non-operational power state (NOPS) as a power state of the storage controller 1240_1, based on the retention level (i.e., "X") and/or the operation mode (i.e., the third mode Mode3) of the host memory buffer HMB.

In operation S2540, the access of the storage controller 1240_1 to the host memory buffer HMB is not permitted. In this case, the storage controller 1240_1 may perform the operations permitted in the non-operational power state, by using the data previously stored in the storage device 1200_1.

In operation S2550, the host 1100_1 sends the retention recovery command to the storage controller 1240_1.

In operation S2560, the storage controller 1240_1 updates contents in the host memory buffer HMB.

As described above, in the third mode Mode3, the storage controller 1240_1 may immediately prevent the access of the storage controller 1240_1 to the host memory buffer HMB and may operate in the non-operational power state.

Meanwhile, the above description is given as the EHM command and the retention command are independent set feature commands. However, this is an example, and the retention command may be replaced with the EHM command. For example, bit "1" of the EHM command may be replaced with retention level "X" of the retention command. Also, bit "1" of the EHM command may be replaced with the remaining retention levels (i.e., retention level "1" and retention level "2") other than retention level "X". As a result, in the above embodiments, the EHM command may be replaced with the retention command.

According to an example embodiment of the disclosure, a memory system selects the best mode from operation modes of a host memory buffer based on a response speed of the host memory buffer and uses the host memory buffer in the selected mode. Accordingly, the overall performance of the memory system may be improved.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An operation method of a storage device which shares a portion of a host memory of a host as a host memory buffer, the method comprising:
   receiving a command to enable the host memory buffer;
   receiving information about a response speed of the host memory buffer; and
   operating the host memory buffer based on the response speed of the host memory buffer,
   wherein the information about the response speed of the host memory buffer comprising a first response speed level, among a plurality of response speed levels, and
   wherein the operating the host memory buffer based on the response speed of the host memory buffer comprises controlling the host memory buffer to operate in a first mode, among a plurality of modes, based on the first response speed level.

2. The method of claim 1, further comprising:
   receiving at least a portion of data present in the host memory buffer to be stored in the storage device.

3. The method of claim 2, further comprising:
   preventing a controller of the storage device from accessing the host memory buffer after the receiving of the at least the portion of the data present in the host memory buffer is completed.

4. The method of claim 2, further comprising:
   performing background operation after the receiving of the at least the portion of the data present in the host memory buffer is completed.

5. The method of claim 1, further comprising:
   preventing a controller of the storage device from accessing the host memory buffer in response to the response speed of the host memory buffer.

6. The method of claim 1, further comprising:
   receiving information about a power state, among a plurality of power states supported by a controller of the storage device.

7. The method of claim 6, further comprising:
   receiving at least a portion of data present in the host memory buffer after the receiving of the information about the power state.

8. The method of claim 7, further comprising:
   preventing the controller from accessing the host memory buffer after the after the receiving of the at least the portion of the data present in the host memory buffer.

9. The method of claim 7, further comprising:
performing an operation permitted in the received power state after the after the receiving of the at least the portion of the data present in the host memory buffer.

10. The method of claim 1, further comprising:
receiving a retention recovery command from the host; and
sending data present in the storage device to the host for updating contents in the host memory buffer.

11. The method of claim 1, wherein the information about the response speed of the host memory buffer comprises an address and a retention level of the host memory buffer, and
wherein the retention level is determined by comparing an expected response speed of the host memory buffer and at least one reference response time.

12. The method of claim 11, further comprising:
selecting an operation mode of the host memory buffer based on the retention level.

13. An operation method of a storage device, the method comprising:
receiving an enable host memory command to share a portion of a host memory of a host as a host memory buffer;
receiving a retention command comprising information about a response speed of the host memory buffer, the information about the response speed of the host memory buffer comprising a first response speed level, among a plurality of response speed levels; and
selecting a first mode, among a plurality of modes, of operation of the host memory buffer, based on the retention command corresponding to the first response speed level.

14. The method of claim 13, further comprising:
receiving at least a portion of data present in the host memory buffer to be stored in the storage device.

15. The method of claim 14, further comprising:
preventing a controller of the storage device from accessing the host memory buffer after the receiving of the at least the portion of the data present in the host memory buffer is completed.

16. The method of claim 13, further comprising:
preventing a controller of the storage device from accessing the host memory buffer in response to the response speed of the host memory buffer.

17. A storage device which shares a host memory of a host as a host memory buffer, comprising:
a nonvolatile memory device storing data; and
a storage controller configured to control the nonvolatile memory device,
wherein the storage controller is further configured to:
receive information about a response speed of the host memory buffer, and
operate the host memory buffer, based on the response speed of the host memory,
wherein the information about the response speed of the host memory buffer comprising a first response speed level, among a plurality of response speed levels, and
wherein the operating the host memory buffer based on the response speed of the host memory buffer comprises controlling the host memory buffer to operate in a first mode, among a plurality of modes, based on the first response speed level.

18. The storage device of claim 17, wherein the storage controller is further configured to receive at least a portion of data present in the host memory buffer to be stored in the storage device.

19. The storage device of claim 18, wherein the storage controller is further configured to be blocked from accessing the host memory buffer after receiving of the at least the portion of the data present in the host memory buffer is completed.

20. The storage device of claim 17, wherein the storage controller is further configured to be blocked from accessing the host memory buffer in response to the response speed of the host memory buffer.

* * * * *